(12) United States Patent
Cholas

(10) Patent No.: US 9,015,270 B2
(45) Date of Patent: Apr. 21, 2015

(54) APPARATUS AND METHODS FOR ENFORCING CONTENT PROTECTION RULES DURING DATA TRANSFER BETWEEN DEVICES

(75) Inventor: Chris Cholas, Frederick, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 935 days.

(21) Appl. No.: 12/901,417

(22) Filed: Oct. 8, 2010

(65) Prior Publication Data
US 2012/0089699 A1 Apr. 12, 2012

(51) Int. Cl.
*G06F 15/16* (2006.01)
*H04L 12/28* (2006.01)

(52) U.S. Cl.
CPC ....... *H04L 12/2812* (2013.01); *H04L 2209/603* (2013.01); *H04L 12/2801* (2013.01)

(58) Field of Classification Search
CPC .................... H04L 12/28112; H04L 2209/603
USPC ........................................................ 709/217
See application file for complete search history.

(56) References Cited

U.S. PATENT DOCUMENTS

| | | | |
|---|---|---|---|
| 6,782,550 B1 | 8/2004 | Cao | |
| 8,166,508 B2 * | 4/2012 | Mitsuji et al. | 725/93 |
| 8,280,982 B2 * | 10/2012 | La Joie et al. | 709/219 |
| 2004/0024688 A1 | 2/2004 | Bi et al. | |
| 2004/0117836 A1 | 6/2004 | Karaoguz et al. | |
| 2004/0193680 A1 | 9/2004 | Gibbs et al. | |
| 2006/0008256 A1 | 1/2006 | Khedouri et al. | |
| 2006/0020786 A1 | 1/2006 | Helms | |
| 2006/0047957 A1 | 3/2006 | Helms | |
| 2006/0218604 A1 | 9/2006 | Riedl | |
| 2007/0174888 A1 * | 7/2007 | Rubinstein | 725/115 |
| 2007/0220024 A1 | 9/2007 | Putterman et al. | |
| 2007/0250872 A1 | 10/2007 | Dua | |
| 2008/0098212 A1 | 4/2008 | Helms | |
| 2008/0103976 A1 | 5/2008 | Read et al. | |
| 2008/0112405 A1 | 5/2008 | Cholas | |
| 2008/0117920 A1 | 5/2008 | Tucker | |
| 2008/0148362 A1 * | 6/2008 | Gilder et al. | 726/4 |
| 2008/0165460 A1 | 7/2008 | Whitby-Strevens | |
| 2008/0212945 A1 | 9/2008 | Khedouri et al. | |
| 2008/0270307 A1 * | 10/2008 | Olson et al. | 705/51 |
| 2008/0288618 A1 | 11/2008 | Vardi et al. | |
| 2009/0031371 A1 | 1/2009 | Munsell et al. | |
| 2009/0102983 A1 | 4/2009 | Malone et al. | |
| 2009/0151006 A1 | 6/2009 | Saeki et al. | |
| 2009/0265750 A1 | 10/2009 | Jones et al. | |

(Continued)

FOREIGN PATENT DOCUMENTS

| | | |
|---|---|---|
| GB | 2381709 | 5/2003 |
| JP | 2001-243707 | 9/2001 |

(Continued)

*Primary Examiner* — Philip Chea
*Assistant Examiner* — Robert B McAdams
(74) *Attorney, Agent, or Firm* — Gazdzinski & Associates, PC

(57) ABSTRACT

Methods and apparatus for transferring data and content between devices while maintaining protection of the content. In one embodiment, one or more content protection rules are associated with the content. These rules include for example subscriber-specific, device-specific and/or content-specific rules on use, copying, or distribution. Content may be provided from a first device to second devices compliant with the rules. In one variant, a mobile version of the content is generated and provides to the requesting device. The original version of content is rendered unusable when the mobile version of the content is provided to the second device, and may only be useable again when the content is removed or otherwise disabled on the second device.

22 Claims, 14 Drawing Sheets

(56) References Cited

U.S. PATENT DOCUMENTS

| | | |
|---|---|---|
| 2009/0282449 A1 | 11/2009 | Lee |
| 2010/0031299 A1 | 2/2010 | Harrang et al. |
| 2010/0088292 A1 | 4/2010 | Tirpak et al. |
| 2010/0198888 A1 | 8/2010 | Blomstedt et al. |
| 2010/0217837 A1 | 8/2010 | Ansari et al. |
| 2011/0078721 A1 | 3/2011 | Wang et al. |

FOREIGN PATENT DOCUMENTS

| | | |
|---|---|---|
| JP | 02/080556 | 10/2002 |
| JP | 03/038704 | 5/2003 |
| JP | 2006-185473 | 7/2006 |
| JP | 2006-311267 | 11/2006 |
| JP | 2007-020144 | 1/2007 |
| JP | 2008-5047 | 1/2008 |
| JP | 2008-021293 | 1/2008 |
| JP | 2008-167018 | 7/2008 |
| JP | 2008-206039 | 9/2008 |
| JP | 2009-71786 | 4/2009 |
| JP | 2009-515238 | 4/2009 |
| JP | 2009-176060 | 8/2009 |
| WO | WO 2009/020476 | 2/2009 |

* cited by examiner

Current time = 10:04a August 10, 2020

| DESCRIPTION | FORMAT | 10:00a | 12:00p | 2:00p | 4:00p | 6:00p | 8:00p | 10:00p | 12:00a |
|---|---|---|---|---|---|---|---|---|---|
| [Movie Title 1] | H.264 | NOT AVAIL (F) | NOT AVAIL (F) | NOT AVAIL (F) | NOT AVAIL (F) | AVAIL | AVAIL | AVAIL | AVAIL |
| [Movie Title 2] | MPEG-2 | AVAIL | AVAIL | *AVAIL (S)* | *AVAIL (S)* | *AVAIL (S)* | *AVAIL (S)* | *AVAIL (S)* | *AVAIL (S)* |
| [Movie Title 3] | MPEG-2 | AVAIL | AVAIL | AVAIL | AVAIL | AVAIL | AVAIL | NOT AVAIL (D) | NOT AVAIL (D) |
| [Music Album 1] | Real | NOT AVAIL (M) | NOT AVAIL (M) | NOT AVAIL (M) | NOT AVAIL (M) | NOT AVAIL (M) | NOT AVAIL (M) | NOT AVAIL (M) | NOT AVAIL (M) |
| [Game 1] | X-BOX | AVAIL | AVAIL | AVAIL | AVAIL | AVAIL | AVAIL | AVAIL | AVAIL |
| [App 1] | Android O/S | AVAIL | AVAIL | AVAIL | AVAIL | AVAIL | AVAIL | AVAIL | AVAIL |
| [Digital Book 1] | ePub | AVAIL | AVAIL | AVAIL | AVAIL | AVAIL | AVAIL | AVAIL | AVAIL |

*FIG. 6c*

APPARATUS AND METHODS FOR ENFORCING CONTENT PROTECTION RULES DURING DATA TRANSFER BETWEEN DEVICES

RELATED APPLICATIONS

This application is related to co-owned, co-pending U.S. patent application Ser. No. 12/480,597 filed on Jun. 8, 2009 and entitled "MEDIA BRIDGE APPARATUS AND METHODS", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data management over a network. More particularly, the present invention is related in one exemplary aspect to apparatus and methods for delivering or distributing programming content and/or data between a plurality of user devices, and protection of the content.

2. Description of Related Technology

Recent advances in digital information processing and technology have made a whole range of services and functions available for delivery to consumers at their premises for very reasonable prices or subscription fees. These services and functions include digital content or programming (movies, etc.), digital video-on-demand (VOD), personal video recorder (PVR) and networked PVR (nPVR), Internet Protocol television (IPTV), digital media playback and recording, as well high speed Internet access and IP-based telephony (e.g., VoIP). Other services available to network users include access to, and recording of, digital music (e.g., MP3 files), as well local area networking (including wire-line and wireless local area networks) for distributing these services throughout the user's premises, and beyond. Network-delivered or network-based gaming and applications ("apps") have also each recently come to the forefront as popular content areas for subscribers.

Currently, many of these services are provided and delivered to the user via a wide variety of different equipment environments including, inter alia, cable modems, Wi-Fi™ hubs, Ethernet hubs, gateways, switches and routers, computers, servers, cable or satellite networks and associated set-top boxes, and PSTNs.

Recent advances in consumer electronics have also led to the widespread introduction of a variety of portable media devices (PMDs) such as, inter alia, portable digital music devices such as the well known Apple iPod™ and other so-called "MP3 players", cellular telephones/smart phones, handheld computers, laptop computers, netbooks, and personal digital assistants (PDA), which allow users to store and playback audio and video files. Various digital audio and video formats are utilized by PMDs. For example, MP3 players store a number of digitized audio files in the form of MP3 files which are then made accessible to the user. Additionally, the services associated with such technology are typically provided by multiple vendors including e.g., a cable service provider (MSO), cellular service provider (CSP), wireless service provider (WSP), VoIP service provider, music download service, "app" stores, game vendors, Internet service provider (ISP), PSTN telephone service, etc.

The myriad of services, equipment, data formats and providers can easily create confusion for a user, as often the equipment or services may not interoperate with one another, thus reducing the overall utility provided to the user, and increasing their frustration level.

Accordingly, playback of audio and video files is often limited to playback only on the device on which the content is stored. In other words, a user may only select audio and video files from a device to be played back to the user on that same device. Thus, if a user stores video content at e.g., a premises equipment, the user is limited to viewing the content on a display associated with the premises.

Current apparatus fail to provide users with the ability to move content stored on a device associated with a first device to a second device (such as a personal mobile device or PMD) while also obeying any restrictions on utilizing, copying and/or distributing the content. That is to say, the use and/or transfer of content stored on a first device must adhere to various rules or conditions. For example, content sources or generators and providers/distributors generally agree on restrictions on the use (e.g., number of plays, and by whom), reproduction, and/or transfer of digital content. In addition, there may be legally-based copyright rules or restrictions that regulate whether archival copies can be made, how many copies can be made, whether protective data such as DRM, watermarking, etc. must be included in the copy process, and how any copies that are made are managed, etc. Additionally, various rules may be instituted by a service provider regarding a particular subscriber's rights with respect to copying, using, and/or distributing content. Under the currently implemented systems, a customer is prohibited in many instances from making content stored at a user premises device available to more than one device connected thereto, while continuing to enforce the aforementioned copyright protection rules.

Furthermore, content conditional access (CA) paradigms currently in use are often quite restricted, and not generally extensible beyond the user's gateway, terminal, or cable/satellite set-top box. So, for example, the user would be prohibited from transferring streamed or downloaded content to their Wi-Fi enabled laptop or PC, since proper conditional access support—e.g., that associated with their host terrestrial (e.g., cable or fiber) or satellite network—does not exist in these devices.

Therefore, improved apparatus and methods for distributing digital services between a user premises and other devices (such as mobile devices), while still adhering to predetermined content protection (e.g., copyright) rules for the content are needed. Such improved apparatus and methods would ideally provide users with the ability to access content stored on a first device, and play it back from a second user device (such as a mobile device) while controlling the transfer of the content so that content owner agreements and copyright laws are obeyed.

SUMMARY OF THE INVENTION

The present invention addresses the foregoing needs by disclosing, inter alia, apparatus and methods for delivering, utilizing, and/or distributing programming content and/or data between a plurality of user devices.

In a first aspect of the invention, a method of providing content from a first subscriber device to a second subscriber device is disclosed. The content may have one or more content protection rules associated therewith. In one embodiment, the method comprises: (i) receiving at the first subscriber device a request for the content from the second subscriber device, (ii) determining whether the content is available, (iii) if the content is unavailable, not providing access to the content to the second subscriber device, and (iv) if the content is available: determining whether the request may be filled, generating a copy of the content, making the content unavailable for subsequent requests, and providing the copy of the content to the second subscriber device. The determination may be based at least in part on the one or more content protection rules associated with the content.

In one variant, the act of determining whether the content is available comprises consulting a table comprising a plurality of content and a status identifier for each of the plurality of content. In another variant, the act of making the content unavailable for subsequent requests comprises changing a status of the content in said table. In yet another variant, the act of determining whether the content is available comprises determining whether the content is present at the second subscriber device. In one variant, the method further comprises, if the content is present at the second subscriber device, not providing access to the content to the first subscriber device.

The copy of the content may comprise a copy specifically formatted to be compatible with capabilities of the second subscriber device. In another variant, the act of making the content unavailable comprises making the content unavailable for transfer from the first subscriber device and for playback at the first subscriber device.

In a second aspect of the invention, a consumer premises device (CPE) configured to provide copyright protected content to a plurality of client devices in communication therewith is disclosed. In one embodiment, the CPE comprises a first interface configured to receive the copyright protected content from a network and at least one rule for the transfer or use thereof, a storage device, a processor and a second interface configured to transmit the copy to the first client device. The processor is configured to run at least one computer application thereon. In one variant, the application is configured to: (i) receive a request for the copyright protected content from a first client device, (ii) determine whether the copyright protected content may be transferred to the first client device, (iii) generate a copy of the copyright protected content, and (iv) cause the content to be marked as unable to be used at the CPE and unable to be transferred to second ones of the plurality of client devices.

In a third aspect of the invention, a content server apparatus configured to provide content to a first device, the first device configured to provide the content to a second device in communication therewith, the content being protected by one or more usage rules is disclosed. in one embodiment, the content server apparatus comprises a first interface configured to receive the content and one or more first usage rules relating to the content from a content source, a storage device, a digital processor, the processor configured to run at least one computer program thereon.

In one variant, the program is adapted to: (i) receive a request for the content from the first device, (ii) query one or more remote devices to collect information relating to at least one of the first device, and/or a subscriber associated therewith, (iii) generate one or more second usage rules, the second usage rules being based at least in part on at least one of the first device, and/or an identity of the subscriber, and (iv) combine the one or more first usage rules and the one or more second usage rules to generate a rules package. The content server apparatus further comprises a second interface configured to provide the content and the rules package to the first device.

In another variant, the first interface is further configured to receive error signals from the first device, the error signals indicating a violation of one or more of the usage rules in the rules package, and the at least one computer program is further configured to determine whether to report the violation of the one or more of the usage rules to a network operator.

In a fourth aspect of the invention, a method of providing protected content to a premises network comprising a plurality of client devices associated with a subscriber is disclosed. in one embodiment, the method comprises: (i) receiving at a first client device a request for delivery of the protected content to a second client device, (ii) if the content is available and the delivery thereof is compliant with one or more protection rules associated with the content, the said content to the second client device, and (iii) preventing the first device from making use of the content while the second client device has access to the content.

In a fifth aspect of the invention, a method of providing content from a first device to a second device is disclosed. In one embodiment, the method comprises: (i) receiving at the first device a request for the content from the second device, (ii) determining whether the content is available, and (iii) if the content is available, determining whether the request may be serviced, the determination based at least in part one or more content protection rules associated with the content and at least one of an identity of a user associated with the second device, and/or an identity of the second device, and (iv) moving the content from the first device to the second device.

In a sixth aspect of the invention, a system for transferring data between devices while enforcing copy protection rules thereof is disclosed.

In a seventh aspect of the invention a computer readable apparatus comprising at least one computer program for ensuring copyright protection rules are enforced during transfer of content between devices is disclosed.

These and other aspects of the invention shall become apparent when considered in light of the disclosure provided herein.

BRIEF DESCRIPTION OF THE DRAWINGS

FIG. 6c is a graphical representation of one embodiment of a schedule guide generated by the CPE of the invention, displayed on a client or display device in communication therewith.

Figure 1:
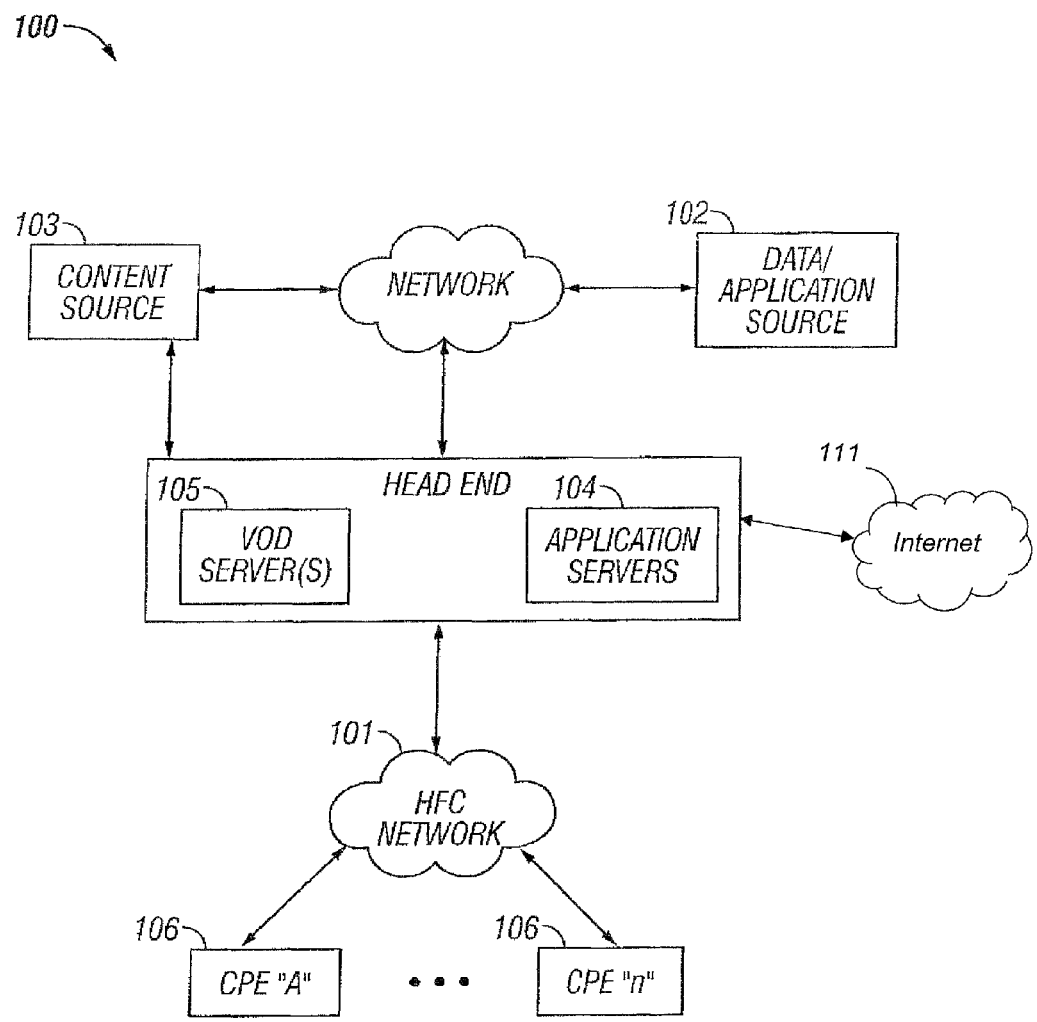
FIG. 1 is a functional block diagram illustrating an exemplary HFC cable network configuration useful with the present invention.

All Figures and Appendices ©Copyright 2010 Time Warner Cable, Inc. All rights reserved.

DETAILED DESCRIPTION OF THE INVENTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGuard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

The term "Customer Premises Equipment (CPE)" refers to any type of electronic equipment located within a customer's or user's premises and connected to a network, such as set-top boxes (e.g., DSTBs or IP TV devices), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type of recording mechanism and/or software environment, located in the headend, the user premises or anywhere else, whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), Wi-MAX (802.16), PAN (802.15), or IrDA families.

As used herein, the terms "personal media device" and "PMD" refer to, without limitation, any device, whether portable or otherwise, capable of storing and/or rendering media.

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11a/b/g/n.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, Wi-MAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention comprises apparatus and methods for utilizing and transferring data and content between devices while maintaining protection rules of the content. In one exemplary embodiment, a content server is utilized to determine not only copy protection rights (such as those utilized by the well known Digital Transmission Content Protection-Internet Protocol (DTCP-IP)), but also the rights of specific requesting subscribers to access, use, copy, and/or distribute content. These rules are provided to, and implemented by, a subscriber device requesting specific content. Specifically, the subscriber device implements the protection rules when determining how the content may be used, and whether the content may be provided to subsequent devices.

In one further embodiment, the subscriber device is configured to enable content to be provided to second devices consistent with the protection rules by generating a mobile or transferrable version of content, and providing this version to the requesting device. To avoid having multiple available versions of the same content existing at both the (source) subscriber device and the target device to which the subscriber transferred the content, the subscriber device employs in one variant a mechanism for marking the original content stored thereon so that it is unavailable for use or further transfer while the mobile version exists at the target device (i.e., so-called "check out"). In this manner, there is at any one time only one available or useable version of the content for the given subscriber. The subscriber may reinstate the original version of the content at the subscriber device (i.e., so-called "check in") in order for it to be used thereon, or to be transferred to yet another device. Reinstatement is accomplished in one implementation by deleting the version existing at the first target device, and transmitting a signal or message back to the subscriber device indicating that the copy has been deleted. This transmission then causes the subscriber device to "unblock" the original version of the content as stored thereon.

In another implementation, the content, rather than being copied, is merely moved from the first device to another subscriber device. According to this implementation, the content must be moved back to the first device in order for it to become useable thereon and/or transferrable therefrom.

In one exemplary embodiment, customer premises equipment (CPE) is used to store the content and implement enforcement of the aforementioned protection rules. The CPE may transfer the content to any one of a number of second devices including, e.g., other CPE, media devices, smartphones, desktop or laptop computers, etc.

The client device responsible for implementing and/or enforcing the protection rules may also work within a premises network or trusted domain for media content, thereby allowing a subscriber total mobility in the premises network. For example, media content from the client device may be accessed via extant networks (e.g., MoCA, Ethernet, WiFi, or PAN) for distribution to any STB, PC, mobile device, or other PMD in the network. The client device may also utilize the existing premises network to allow other devices to share media content with it.

Various business rules may also be implemented by the host network or subscriber device, including those which are provided at the content server regarding a particular subscriber's access rights, usage rights, and ability to copy content.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having a multiple systems operator, digital networking capability, and plurality of client devices/CPE, the general principles and advantages of the invention may be extended to other types of networks and architectures, whether broadband, narrowband, wired or wireless, terrestrial or satellite, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

Network

FIG. 1 illustrates a typical content-based network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. Exemplary embodiments of the "unified" CPE of the invention are described subsequently herein with respect to FIGS. 2 and 3.

Figure 1A:
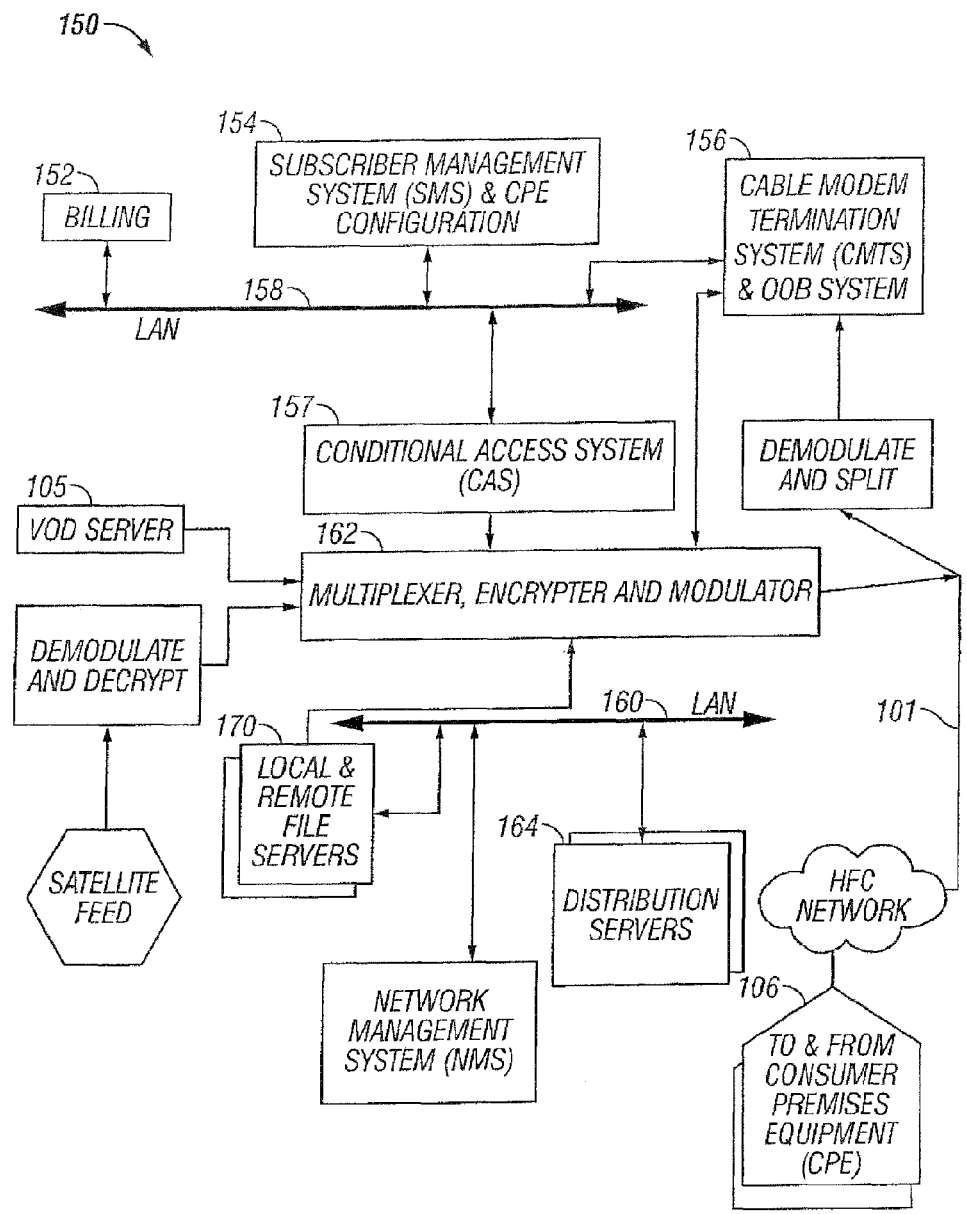
FIG. 1a is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
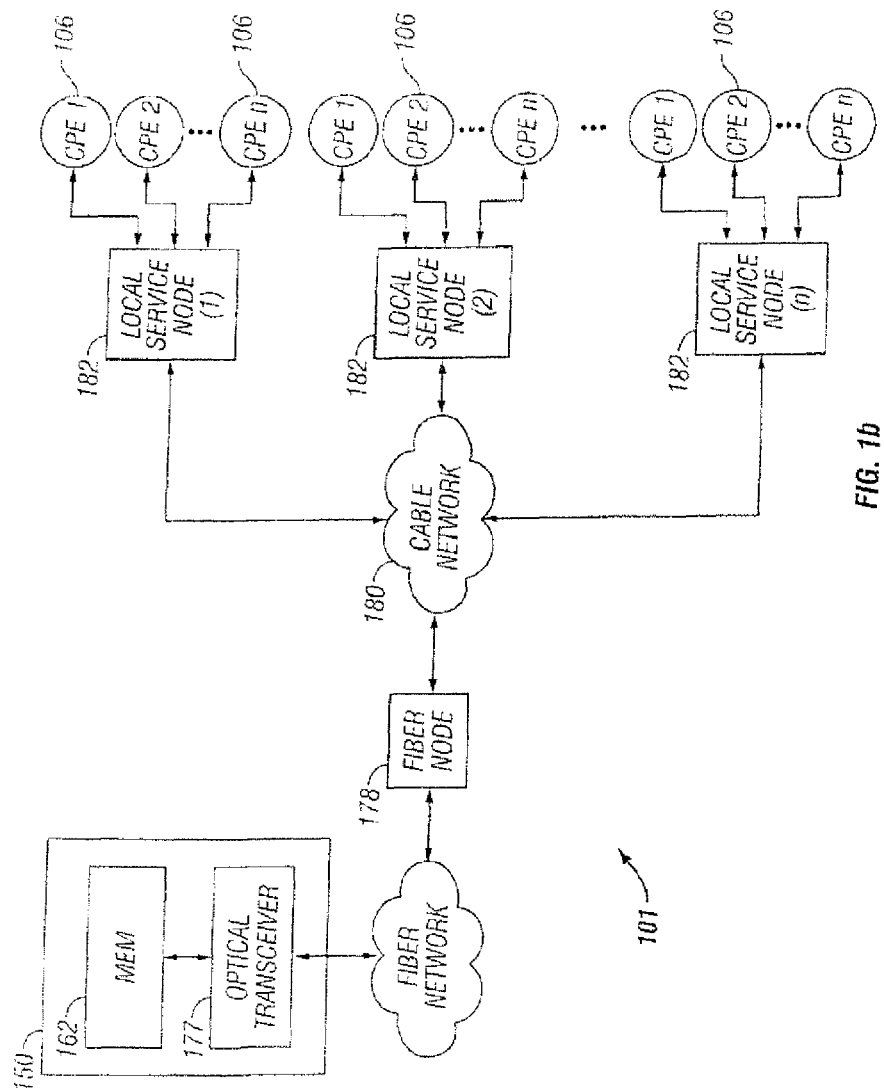
FIG. 1b is a functional block diagram illustrating one exemplary local service node configuration useful with the present invention.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

In addition to on-demand and broadcast content (e.g., video programming), the system of FIGS. 1a and 1b (and 1c discussed below) also deliver Internet 111 data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels, such as via a multiplexed transport stream (MPTS). In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs, such as described below with respect to FIG. 1c.

The CPE 106 are each configured to monitor the particular assigned RF channel (such as via a port or socket ID/address, or other such mechanism) for IP packets intended for the subscriber premises/address that they serve.

Figure 1C:
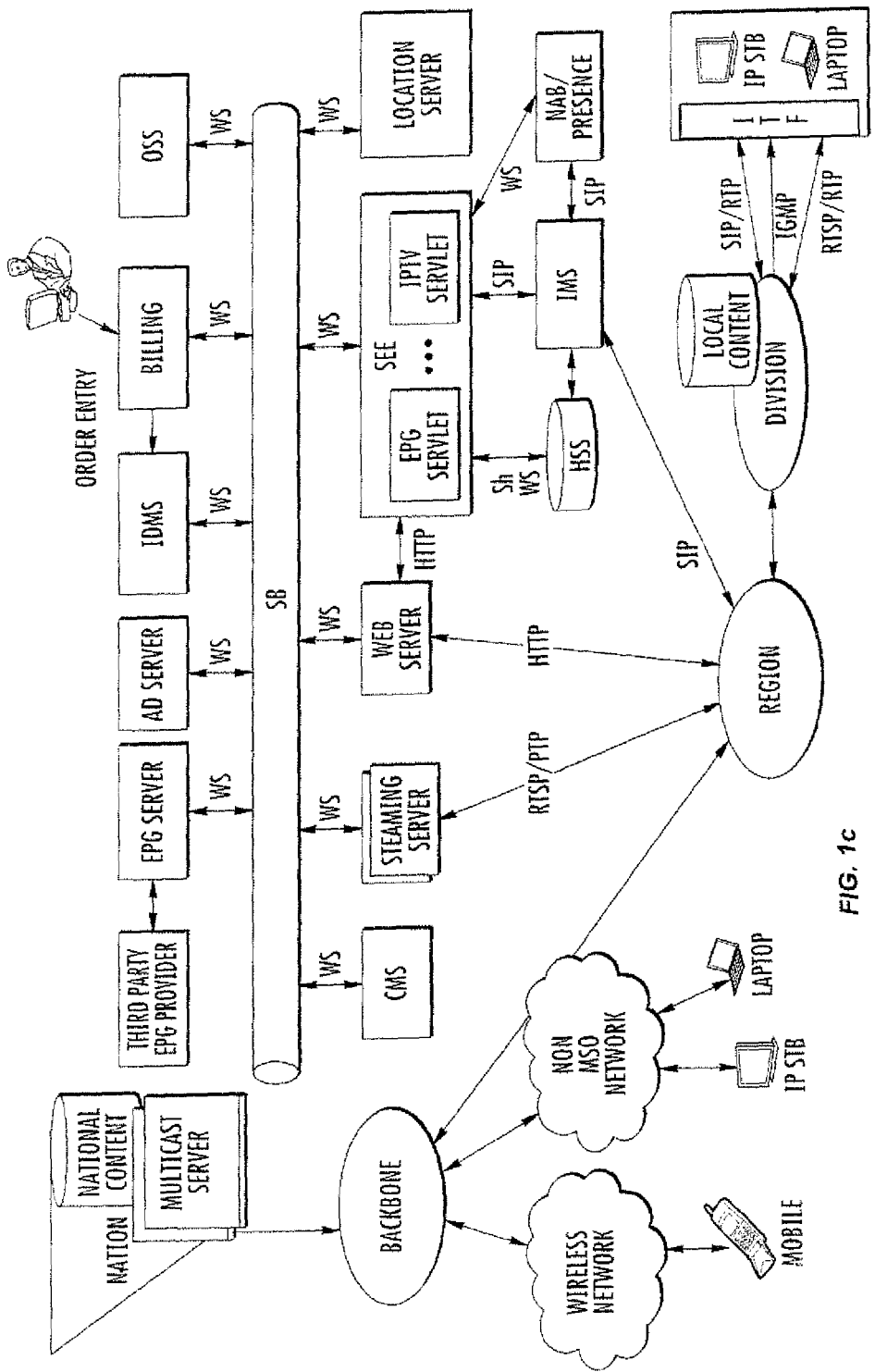
FIG. 1c is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content). FIG. 1c illustrates one exemplary implementation of such a network, in the context of an IMS (IP Multimedia Subsystem) network with common control plane and service delivery platform (SDP), as described in co-pending U.S. Provisional Patent Application Ser. No. 61/256,903 entitled "METHODS AND APPARATUS FOR PACKETIZED CONTENT DELIVERY OVER A CONTENT DELIVERY NETWORK", incorporated herein by reference in its entirety. Such a network provides significant enhancements in terms of common control of different services, implementation and management of content delivery sessions according to unicast or multicast models, quality-of-service (QoS) for IP-packetized content streams, etc.; however, it is appreciated that the various features of the present invention are in no way limited to any of the foregoing architectures.

Data Transfer Network Architecture

Figure 2:
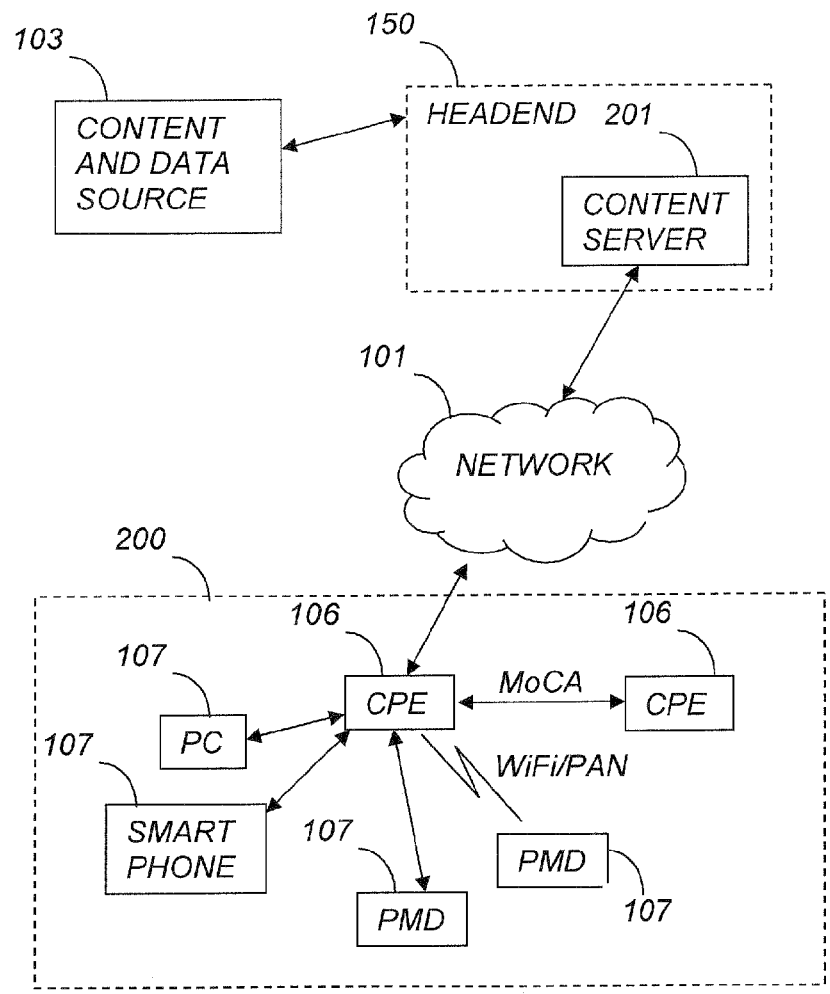
FIG. 2 is a functional block diagram illustrating a distribution network architecture configured in accordance with one embodiment of the invention.

FIG. 2 is a block diagram illustrating a content and data distribution network architecture configured in accordance with one embodiment of the invention. As illustrated, content and data are provided to a network headend 150 from a content and data source 103. A content server 201 in the network headend is configured to provide requested content and data to one or more consumer premises equipment (CPE) 106 in communication with the content server 201 via the network 101. In one embodiment, the network comprises a managed (e.g., MSO-controlled) content and data delivery network, such as e.g., a content distribution network of the type discussed above with respect to FIGS. 1-1c.

The CPE 106 of FIG. 2 is configured to communicate with various other "client" devices including e.g., other CPE 106, personal media devices (PMD) 107, etc. in order to provide access to the requested content and data thereto. It will be appreciated that the term "client" in the context of the present invention in no way mandates a client-server or master-slave relationship; in fact, a "client device" may act as a local content server or source, as described in greater detail subsequently herein.

The CPE 106 may further be in communication with a second CPE 106 for the delivery of content and data thereto as well. The CPE 106 comprises, or is in communication with, a separate storage device (not shown) for storing content which is presented to the other devices. A subscriber-specific network 200 is thereby created for the delivery of content from the CPE 106 to the various devices (client 107, CPE 106, etc.).

The exemplary CPE 106 may comprise for example a set top box (STB), a digital video recorder (DVR), or any number of consumer devices. The client devices 107 of FIG. 2 may comprise any type of device, such as PCs, laptop computers, portable music players (e.g., MP3 players, iPods™, etc.), portable video players, cameras, video recorders, smart phones, etc., which are coupled to the CPE 106 via any number of different interfaces. In another embodiment, the client 107 may comprise a portable storage device having a writeable optical drive for writing media files to removable optical disks. For example, so-called "CompactFlash™", a flash-based USB key, secure digital card, or the like, may be utilized, the CPE 106 being configured to receive the portable storage device (such as by having the appropriate port).

Communication between the exemplary CPE 106 and the client devices 107 and other CPE 106 may be wired (e.g., CAT-5, MoCA, etc.), or be conducted over WLAN (e.g., Wi-Fi), PAN, or other wireless communications protocol. For instance, a "premises LAN" may be created (e.g., at the premises network 200), which may include for example the network formed over the installed coaxial cabling in the premises, a Wi-Fi network, and so forth.

The CPE 106 provides the capability to transmit/deliver a plurality of video formats of various resolutions and bitrates including, without limitation, MPEG-1, MPEG-2, MPEG-4, AVC/H.264, WMV, VC-1, AVI and Real. The CPE 106 also is capable of transmitting/delivering a plurality of audio formats including e.g., MPEG-2 Audio, AC-3, AC-3+, AAC+, MP3, Real and WMA. A plurality of photo or image formats are also supported, including e.g., Graphic Image File (GIF), Joint Photographic Experts Group (JPEG), Bitmap (BMP) and Tag Image File Format (TIFF).

The CPE 106 is not required to contain a decoder for decoding audio/video/media; however, it will be recognized that such decoder capability (as well as transcoding, e.g. decoding in a first format and then encoding in a second format) and/or transrating capability (i.e., processing so as to change bitrate, or establish a constant bitrate output) can be implemented within the CPE 106 or associated device if desired.

In one exemplary embodiment, the CPE 106 is compliant with OpenCable™ Home Networking Architecture as disclosed in OpenCable™ Specification Home Networking Protocol 2.0 (OC-SP-HNP1.0-I01-080418 dated Apr. 18, 2008), which is incorporated herein by reference in its entirety. As discussed therein, a compliant CPE 106 includes, inter alia, compatibility with the Digital Living Network Alliance (DLNA) requirements such as DLNA version 1.0 or the later version thereof. This capability allows, among other things, rendering of content in DLNA 1.5 format, and generating a content directory using DLNA, as described in greater detail below.

In yet another embodiment, the CPE 106 of FIG. 2 may comprise a media bridge apparatus of the type discussed in co-owned, co-pending U.S. patent application Ser. No. 12/480,597 previously incorporated herein by reference in its entirety. As discussed therein, content and data are transmitted to various devices for use and viewing thereon via a media bridge. The bridging apparatus may be used, for example, to convert content stored on a PMD to a format capable of being presented on a user's set-top box or other client device, and vice versa. Control of the presentation is also provided by the bridging apparatus. In one embodiment, the apparatus enables a user to access and control playback of media from a PMD via a user interface associated with a television, personal computer or other user device. The apparatus may also enable content stored on the PMD to be copied and stored on a user's digital video recorder (DVR) or other storage apparatus, and to allow the premises user devices to share media content with the PMD while maintaining appropriate copyright and digital rights management (DRM) requirements associated with the content being manipulated.

The CPE 106 physically and logically interfaces with other CPE 106 and client(s) 107. The present invention also contemplates the use of different types of physical/logical interfaces, including a substantially universal or converged interface (such as USB 2.0, USB 3.0, IEEE-1394, DisplayPort, etc.), or alternatively, a plurality of discrete interfaces.

As will be discussed in greater detail below, in one embodiment, the CPE 106 acts as a "converter" of sorts, converting content and data received at the CPE 106 to a format suitable for the client 107.

In yet another embodiment, the CPE 106 utilizes a Universal Plug and Play (UPnP) AV media server to allow content such as music, videos and photos to be delivered to UPnP media rendering/recording devices (CPE 106, client 107, etc.). Universal Plug and Play (UPnP) AV media server requirements are described in detail in, inter alia, MediaServer:1 Device Template Version 1.01, dated Jun. 25, 2002 which is incorporated herein by reference in its entirety; see also "UPnP™ Device Architecture" Version 1.0, dated Jun. 8, 2000, also incorporated herein by reference in its entirety.

Although content delivered to the various devices in the present invention (e.g., CPE 106, client 107, etc.) may optionally comprise personal or other media content which does not require rights management (e.g., Digital Rights Management (DRM)) or copy-protection, the present invention additionally provides mechanisms for the secure transfer of content between devices as discussed throughout.

"Protected" content is delivered in one embodiment to the CPE 106 with the appropriate security package. The CPE 106 receives and authenticates the security package. In one variant, no rendering or recording device (e.g., CPE 106) is permitted to render or record protected content without proper authentication of itself to the network, and authentication of the security package. Still further, authentication (such as by previous registration of the devices to the CPE 106) may be required prior to the delivery of protected content from the CPE 106 to the client 107.

In another variant, the rendering device is configured to authenticate the source of the content (i.e., will only render or record content from an authenticated source). For example, the apparatus and methods described in U.S. patent application Ser. No. 11/080,693 entitled "METHOD AND APPARATUS FOR NETWORK CONTENT DOWNLOAD AND RECORDING" and filed Mar. 14, 2005 incorporated herein by reference in its entirety, can be used to provide such functionality, although other approaches may be used as well.

Figure 2A:
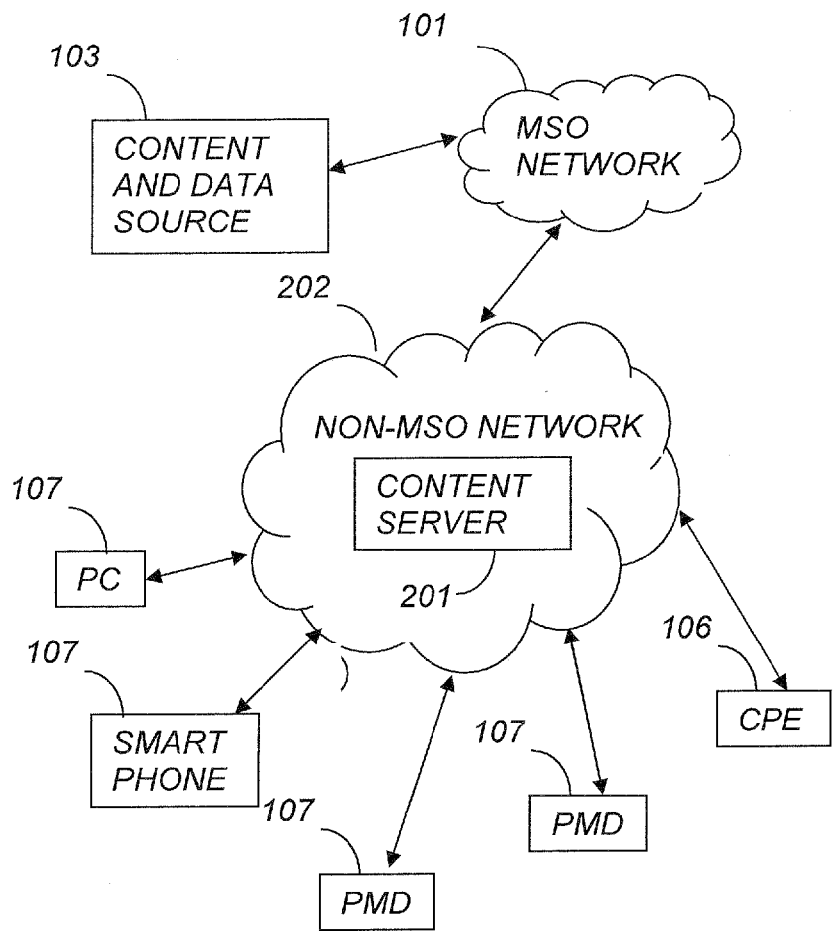
FIG. 2a is a functional block diagram illustrating a distribution network architecture configured in accordance with a second embodiment of the invention.

Referring now to FIG. 2a, a second embodiment of a content and data distribution network architecture useful with the present invention is shown and described. In the embodiment of FIG. 2a, content and data from the content and data source 103 is provided via the MSO network 101 to a content server 201 at a second, non-MSO network 202. In one embodiment, the content and data may be provided thereto via a gateway apparatus (not shown) located in the MSO network 101 and in communication with the content server 201. According to the embodiment of FIG. 2a, various CPE 106 and clients 107 may communicate directly with the content server 201 in the non-MSO network 202.

The architecture of FIG. 2a may be utilized, for example, to provide content and data which is associated with a subscriber at the headend 150 of the MSO network 101 to other devices (e.g., clients 107, CPE 106) also associated with that subscriber via a second, non-MSO network 202, such as the Internet or other unmanaged network.

Content and data may be delivered regardless of the device that has requested the content; i.e., authentication and authorization may completely rely on the subscriber's identity, such as via a login procedure, challenge question, personalized identification device (e.g., RFID tag, SIM card, etc.). Alternatively, content and data may only be delivered to devices which have been registered to the subscriber's account, and/or those devices which are authenticated as discussed above.

In another variant, the non-MSO network 202 comprises the Internet. A personal video encoder (PVE) or comparable device may also be used as part of or may be in communication with the CPE 106 (or an associated client device coupled thereto). For example, the "Slingbox" device manufactured by Sling Media of San Mateo, Calif. is one such exemplary device which is capable of enabling a user to watch TV programming from various locations via an Internet-connected PC or similar device. The device is generally connected between the subscriber's cable/satellite video drop and DSTB, and has a TV tuner inside. The user tunes to a given channel, and the device encodes the video streamed over the cable/satellite in Windows Media or similar format. The encoded content is streamed to a client application on a Windows XP-based or similar PC via an IP network such as the Internet, and hence the user can view the data locally (i.e., at the same premises) or remotely, so long as they have access to the IP distribution network (e.g., non-MSO network 202).

Using the architecture discussed in FIGS. 2 and 2a, content and data, e.g., music files, digital camera image data, etc. can be received at a first device (e.g., CPE 106) and readily moved to additional devices (e.g., client 107), or from network environment to other network environment (such as from an MSO network 101 to a non-MSO network 202).

It is further appreciated that in either architecture (FIGS. 2 and 2a), an MSO network-based server may be provided (not shown) which is configured to store content. The stored content is associated with a particular subscriber, and when requested by the subscriber, may be provided thereto via the non-MSO network 202. For example, the storage entity of co-owned, co-pending U.S. patent application Ser. No. 11/440,490 filed May 24, 2006 and entitled "PERSONAL CONTENT SERVER APPARATUS AND METHODS", which is incorporated herein by reference in its entirety. As discussed therein, a "network DVR" or a "virtual DVR" maintained for the subscriber at the head-end or other location outside of the subscriber premises (including e.g., the non-MSO network 202). In another embodiment, all content storage is performed/maintained at the content server 201 located at the non-MSO network 202 (see FIG. 2a), or at the MSO network 101 (see FIG. 2). In yet another embodiment, as noted above, content is stored at the user premises device (e.g., CPE 106 or another device in communication therewith, such as a DVR).

Although in the above-described embodiments content may be stored remote to the user's premises, the CPE 106 (or the content server 201) may still enforce the aforementioned content protection rules as discussed with respect to the exemplary methods below.

Methodology

Figure 3:
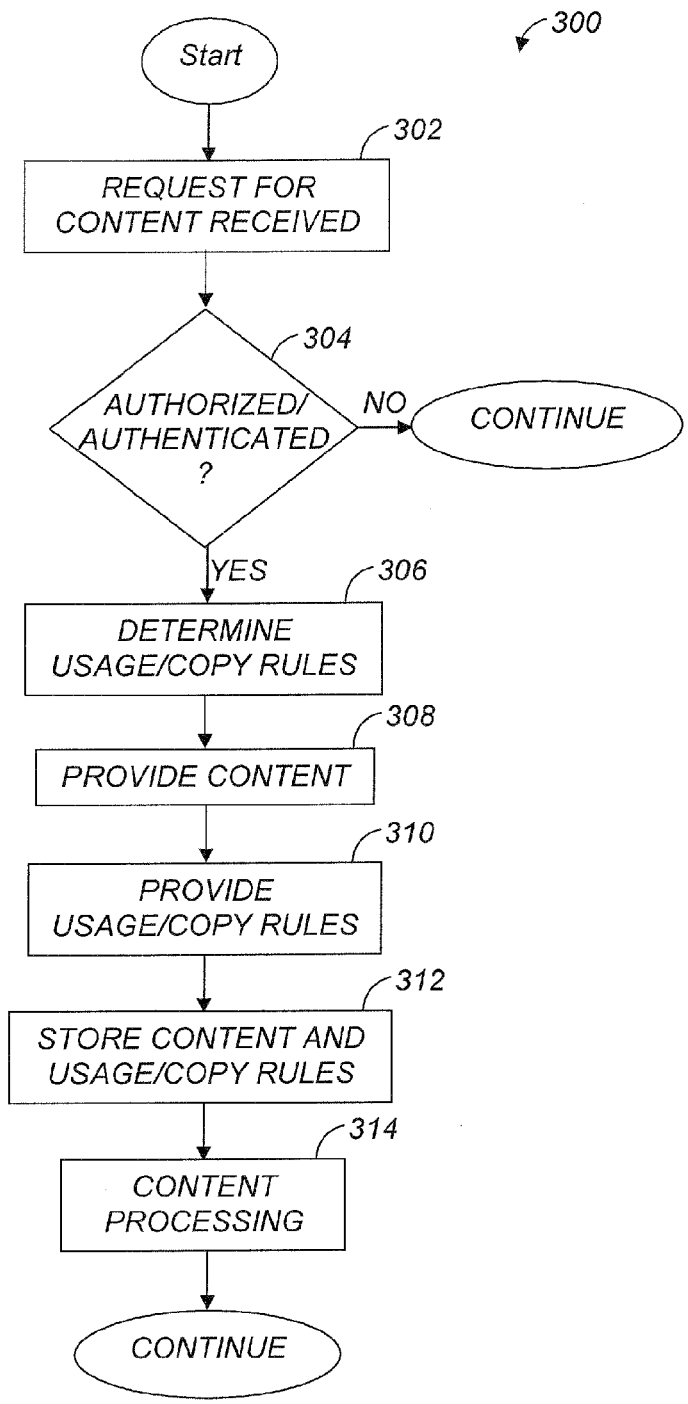
FIG. 3 is a logical flow diagram illustrating one embodiment of a method for providing content and data to a first device while enforcing copyright protection of the content and data.

Referring now to FIG. 3, one embodiment of a method 300 for receiving content from a network at a first device is illustrated and described.

As shown, per step 302, a command requesting access to content is received at a network entity responsible for providing content to the devices. The network entity may comprise a content server 201 disposed at an MSO network 101 (see FIG. 2), or at a non-MSO network 202 (see FIG. 2a). The request of step 302 may result from a selection of content at a user device, such as from an electronic program guide (EPG), a promotion (see for example, co-owned, co-pending U.S. patent application Ser. No. 10/948,271 filed Sep. 22, 2004 and entitled "SCHEDULING TRIGGER APPARATUS AND METHOD" which is incorporated herein by reference in its entirety), or other means. In yet another embodiment, as discussed in the previously referenced U.S. patent application Ser. No. 10/948,271, the command to record a content may be received from a first device, yet indicate recording to occur on a second device (such as e.g., client 107).

Per step 304, the network entity (e.g., content server 201), or other entity in communication therewith determines whether the requesting device is authorized to receive the requested content, and/or authenticates the requesting device (or a subscriber associated with the device), as previously described. Apparatus and methods for determining authorization and/or authentication may for example be of the type discussed in co-owned, co-pending U.S. patent application Ser. No. 12/536,724 filed Aug. 6, 2009 and entitled "SYSTEM AND METHOD FOR MANAGING ENTITLEMENTS TO DATA OVER A NETWORK", which is incorporated herein by reference in its entirety. If the requesting device/user is not authorized and/or authenticated, content cannot be provided thereto.

"Authentication" as used herein may refer generally to a determination that the requesting device is the device which may receive content, and/or that a user of the requesting device is a subscriber to the network or other entitled user. This may be accomplished by requiring the user to log into the network (such as by password and/or user identification, challenge question, etc.) or by comparing some other unique identifier (such as MAC ID, digital signature, SIM ID) to a list of authenticated device identifiers at a headend entity (such as the aforementioned content server 201). Other mechanisms may be used as well.

"Authorization" as used herein may refer generally to the determination that the requested content is within the set of content the subscriber or device may receive, and/or the proposed use of the content is within the allowed use set for that subscriber. For example, authorization may be used to refer to whether the requested content is within the subscription plan (e.g., level or tier) for the requesting user. Other security checks may be performed at this step as well.

It will also be appreciated that the content itself can be physically secured if desired; e.g., via public/private key or AES encryption, use of a cryptographic residue or hash for integrity protection, etc.

Next, at step 306, once the requesting device is authenticated/authorized, a set of usage/copy rules are determined for the requested content. The usage/copy rules may comprise metadata stored along with the requested content, may be transmitted separately (e.g., via an encrypted file), or may be manually entered. In one embodiment, the usage/copy rules comprise Digital Transmission Content Protection-Internet Protocol (DTCP-IP) rules indicating (i) whether content may be copied (e.g., "copy never"), (ii) how many times the content may be copied (e.g., "copy once", "copy freely", etc.). Additionally, these usage/copy rules may comprise extended usage requirements including e.g.: (1) a length of time or expiration for the content, (2) a rule for automatically causing deletion of the content after play-out (or a number of play-outs), (3) disablement of various functions (e.g., "trick modes"), and/or (4) limitations on the number of play-outs of moved content (e.g., N play-outs within X period of time). Any or all of the aforementioned usage rules may be further limited based on e.g., the class or type of devices which may copy the content, the type of content, the subscription level of the subscriber associated with the devices, etc. Additional usage/copy rules may also be provided.

In one exemplary embodiment, a first set of usage/copy rules may be received from the content source (or other network entity). These rules may include more traditional usage/copy rules such as the aforementioned "copy never", "copy once", "copy freely", etc., or other types of restrictions. The usage/copy rules are received at the content server 201, and associated with content. The content is then requested by a user and transmitted thereto. The aforementioned rules are provided to the requesting device alongside a second set of usage/copy rules which are specific to the requesting device and/or subscriber. For example, the content server 201 may, when a request for content is received, query a billing entity (or other network entity) to determine one or more additional rules sets to be applied to the subscriber. Assuming, for example, the requesting subscriber is a lower tier subscriber with only rights to maintain a transmit a copy from a first device to a second device for a prescribed period of time, the content server 201 establishes these restrictions as a second set of usage/copy rules. A rules package including the traditional (e.g., DTCP-IP) rules, as well as the subscriber-specific rules, may be provided to the subscriber with the content. It will be appreciated that the second set of rules may alternatively or concurrently be specific to the requesting device, other devices within a subscriber's premises (which may or may not be under MSO control), and/or may be still further related to the requested content itself (such as "premium" content).

Moreover, one embodiment of the method 300 checks the aforementioned multiple (e.g., two) rule sets for consistency. For example, the first rule set generated by the content source (or indigenous to the content itself) may have use or copy restrictions which are inconsistent with uses or copy rules in the second set, such as where the first set has a prohibition on any copying, yet the second set does not. To this extent, the rule sets are in one implementation of the invention applied so that all restrictions are enforced; i.e., the sum of the most restrictive rules, regardless of whether in the first or second set. Hence, in the foregoing example, the fact that the second set has a less restrictive copy policy is immaterial; the first (more restrictive) policy is none-the-less enforced.

However, it will be appreciated that other rule logic can be applied. For example, in the foregoing example, another implementation of the invention applies predetermined logic to the conflict to resolve it. For instance, one such resolution logic might over-ride the first rule set in favor of the second in cases where such conflicts exist (i.e., MSO policies trump those of the content source). In another variant, the logic (e.g., computer program running on the server 201) seeks additional inputs so as to make a decision (e.g., the user's longevity as a customer, billing history, listing of devices registered with the MSO, etc., so as to permit a "risk assessment" of that subscriber for surreptitiously copying and distributing the content. Likewise, the severity or scope of a first set rule may be modified or ameliorated by the MSO; e.g., where the content source specifies "copy never", the MSO might modify this rule to "copy once".

In another embodiment, the second (e.g., MSO) rule set is derived from the first set; i.e., uses the first set as an input to a rule generation process. Only one rule set is ultimately transferred to the user/requesting device from the MSO, this set being based both on considerations or policies specified by the content source and those of the MSO.

It is appreciated that in one embodiment, more inclusive usage/copy rules may be permitted for different classes of subscribers. For instance, highest tier subscribers may be given "copy freely" rights to more or different content than lower tier subscribers. Similarly, a subscriber may enroll in a pay-per-copy service, permitting the subscriber to have altered usage/copy rights for content depending on the level of payment received. For example, a subscriber may pay a first rate to have content be labeled as "copy once", and additional fees for having that same content with "copy freely" usage/copy rules delivered to the user. Each of the above may be incorporated into either the first provided or second provided set of usage/copy rules.

Per steps 308 and 310 of the method 300, the requested content and usage/copy rules (such as a rules package) are provided to the requesting device. The content and data (usage/copy rules) may be provided via the aforementioned methods and apparatus discussed above with respect to FIGS. 1-1e.

Next, per step 312, the content is recorded and/or stored at the requesting device; the usage/copy rules are also stored at the requesting device. In one embodiment, the requesting device comprises a CPE 106 having digital video recorder (DVR) capabilities, and/or a DVR in communication therewith. The content may be stored at the DVR, whereas the metadata files indicating the usage/copy rules can be stored at the CPE 106 itself. As will be discussed below, the usage/copy rules are in one implementation of the invention utilized by a copyright rules enforcement application 606 running at the CPE 106.

Next at step 314, the content is processed. In one embodiment, content processing may include decoding, decrypting, etc. the content in preparation for its display by the CPE 106 (or a display device in communication therewith). In another embodiment, the CPE 106 may process the content into one or more compressed or alternative formats for subsequent transmission to mobile devices (such as e.g., clients 107 as will be discussed in detail below). These so-called "portable" versions of content are stored at e.g., the CPE 106 or a storage device associated therewith. Moreover, the content may be processed (e.g., transcoded or transrated) before it is even delivered to the CPE; i.e., prior to steps 308 and 310 above, such as by the content server 201.

Figure 4:
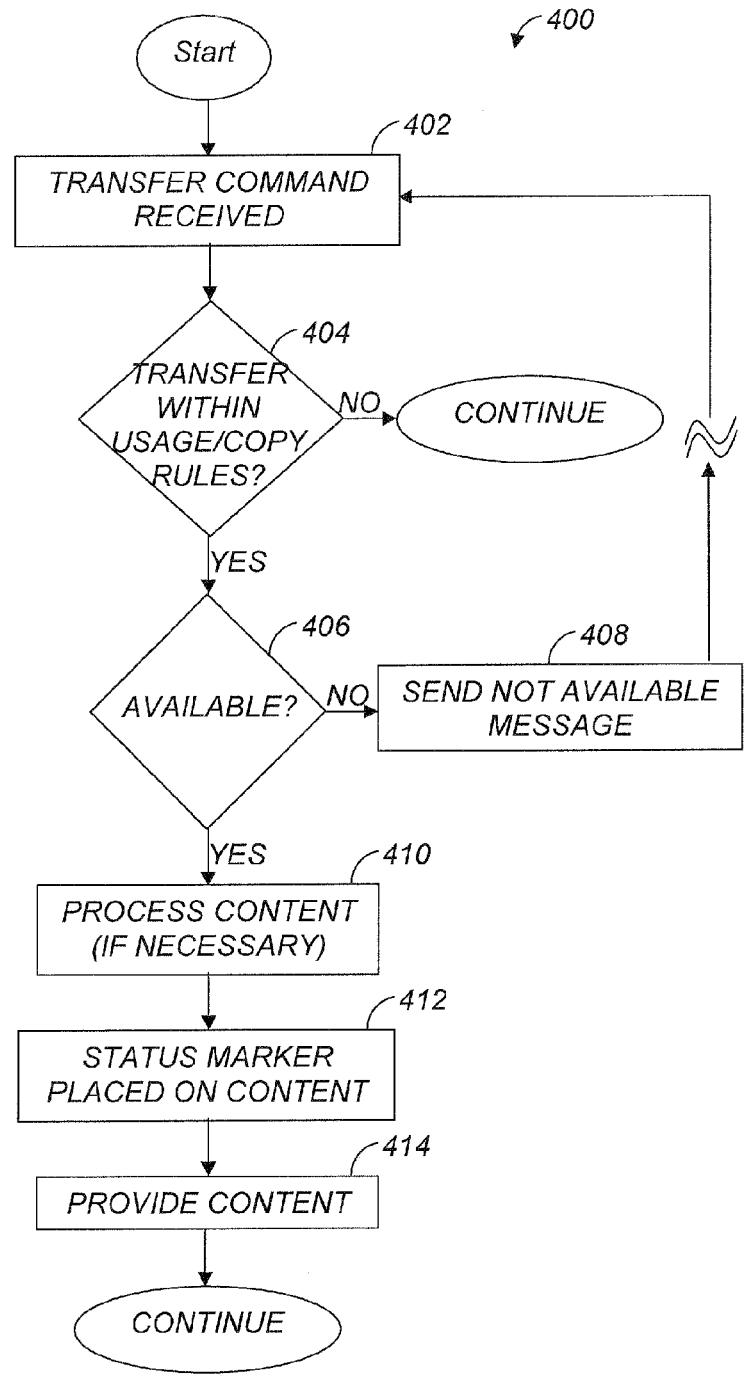
FIG. 4 is a logical flow diagram illustrating one embodiment of a method for transferring content and data from the first device to a second device while enforcing copyright protection of the content and data.

Referring now to FIG. 4, an exemplary method 400 for transferring content from a first user device to a second user device while maintaining appropriate protection of the content is illustrated. As shown, per step 402, a transfer command is received at the first device (such as a CPE 106) from the second device (such as a client 107). In one embodiment, the command is generated when a user of the second device selects the content from a list of content generated by the first device and provided to the second device. In other words, the first device may be configured to generate a list or directory of content which is available for transmission to one or more second devices. The determination of which content is available for transmission to second devices may be based on the aforementioned usage/copy rules and the list derived at a processor of the CPE 106. Alternatively, the available content list may be generated at another entity, such as the aforementioned content server 201.

It will also be appreciated that while step 402 described above utilizes a "request/response" model, the method 400 may also be configured to operate using a "content push" model, whereby the source (first) device initiates a transfer of the content without receiving a request for it. This might occur where a user wants to move content from the first device to a mobile second device (e.g., PMD), such as in anticipation of leaving the premises for the day. This "push" model can also be automated if desired; e.g., the first device pushes new content after it has been received from the network or another device, periodically (e.g., once every week), on an opportunistic basis, etc.

Next, at step 404, the CPE 106 determines whether the requested transfer is compliant with the usage/copy rules for the requested content. It is at this step that the CPE 106 consults the usage/copy rules to determine e.g., whether or not the content can be copied, whether the number of times the content may be copied has been exceeded, whether the copy availability time period of the content has expired, etc. If the usage/copy rules indicate the transfer is not within these copy rules, the content cannot be provided. An error message or link to a help resource may be presented to the user of the second device at this time if desired.

If the transfer is within the usage/copy rules, it is next determined whether a copy of the content is available (step 406). For example, suppose content which is recorded and stored at the CPE 106 may not be copied (beyond the single copy stored at the CPE 106); if the CPE copy is being used (e.g., currently displayed on the CPE 106 or another device), the content is marked as not available (see step 410 below), and a "not currently available" message is returned to the requesting user at step 408.

If the content is available (either because a single copy is not in use, or an additional copy is permitted to be made), the content is processed at step 410 (if necessary). In one embodiment, the processing step comprises transcoding or re-encoding the content to a format suitable for display at the requesting device (e.g., from one codec format to another, or at a resolution more suitable for the second device). Alternatively, the transcoding and/or re-encoding may occur at a network entity, and the various formats of the content be provided to the CPE 106 without requiring transcoding functionality at the CPE 106. According to this embodiment, a standard set of formats may automatically provided or, in a second variant, the network entity may select one or more appropriate formats to provide to the CPE 106 based on all of the devices (e.g., clients 107) associated with the CPE 106 which are registered with the network.

When it is determined that content is available, steps are taken to change the status of the content prior to it being transmitted to the requesting device. At step 412, a status marker is placed on the content. For example, in the instance where only a single copy of content is permitted (i.e., the content stored at the CPE 106 is "copy once" and the CPE 106 has that copy), the marker will be placed on the CPE copy (i.e., the "original") indicating that it is in use. This step will be performed regardless of the format of the content provided to the requesting device. An appropriate format version of the requested content can be provided to the client 107, while keeping the CPE version at the CPE 106, under the "copy once" rule. These rules are enforced via the status marker. Hence in one embodiment, only a single copy at a time is accessible by a user; the copy at the CPE 106 is marked unavailable (i.e., is "checked out") when a copy is provided to the client 107. As discussed elsewhere herein, the content must be "checked in" in order to be made available for subsequent use on another device (including the CPE 106 which provided the content).

In one embodiment, the aforementioned "checked in" (accessible) and "checked out" or (inaccessible) status may be implemented via a small XML file which may be altered, added and/or removed from the content files indicating its status. Alternatively, the CPE 106 may comprise a simple database or data store listing an identifier of content and a corresponding one or two bit identifier (e.g., yes/no for one bit, $2^2=4$ states for two bits, etc.) indicating the availability or status of the content. In a further embodiment, mechanisms for indicating a status of content (as "checked in" or "checked out") are contained within the digital rights management (DRM) or other access control technology employed to provide copyright protection for the content.

Lastly, per step 414, the requested content is provided to the second device (e.g., client 107). As noted above, the provided version of the content may be in a format particularly suitable for display or use by the client 107 as generated at either the CPE 106, or a network entity (such as the content server 201).

Figure 5:
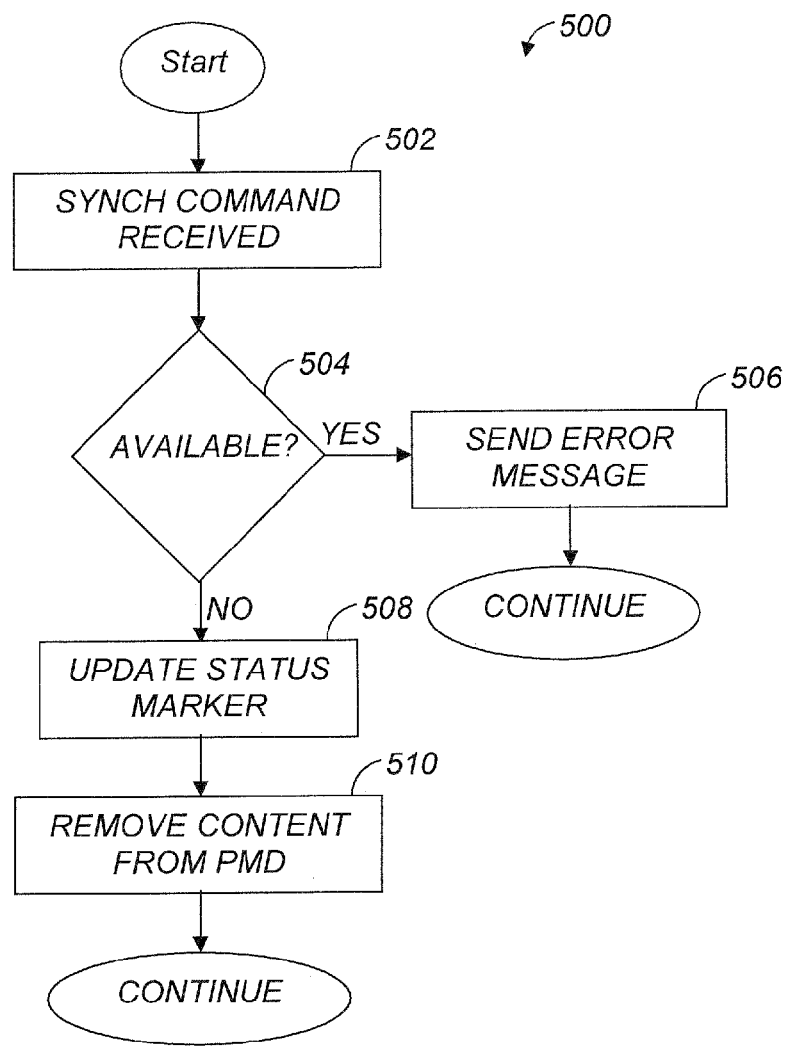
FIG. 5 is logical flow diagram illustrating one embodiment of a method for releasing content from the second device back to the first device in order to enforce copyright protection of the content and data.

As previously described, the content must be "checked in" to the CPE 106 it order for it be become available again for use on the CPE 106 or another device. Referring now to FIG. 5, an exemplary method 500 for re-initiating or reinstating ("checking in") content which was transferred from a first device to a second device (discussed above with respect to FIG. 4) is described. As discussed above, when the content is requested by or provided to a client 107, a physical copy of the content is kept at the CPE 106, and the client 107 is instead provided with a second copy of the content (e.g., a mobile or portable version which in many cases is particularly formatted for the client 107). As also noted above, the copy resident at the CPE 106 is made unavailable while the second copy is held at the client 107. Hence, FIG. 5 provides a method for making the content available once again at the CPE 106 either for use thereon, or for subsequent transfer to another device (e.g., client 107 or second CPE 106).

In one embodiment, the method of FIG. 5 must be performed prior to or simultaneously with the clearing of content from the client 107. In other words, when the user of the client 107 selects to delete the content from their device, the content will not be removed unless the method of FIG. 5 is performed. Additional and alternative rules for the removal of content from the client 107 and/or for triggering the synchronization operation are discussed elsewhere herein.

As shown, per step 502 of the method, a synchronization command is received from the client 107. The synchronization command may be generated automatically after a predetermined period. For example, certain content may have an expiration time/date upon which the content must be returned (i.e., "checked in") to the CPE 106. Alternatively, the synchronization signal may be generated when a user instantiates a "synchronization" or "check in" function for returning the selected content back to the CPE 106 from which it was received.

The synchronization signal may be transmitted wirelessly from the client 107 or alternatively, occur (either manually or automatically) upon physical connection of the client 107 to the CPE 106, such as via a USB, HDMI, 1394, DisplayPort, or other cable. In the event the synchronization signal is transmitted via a physical connection between the devices, there may be considerable wait time between instances where the client 107 is connected to the CPE 106 in order to effect the synchronization. Thus, it may be appreciated that certain content (such as expired content as discussed elsewhere herein) may be made "unavailable" at the client 107 despite its being "checked out" from the CPE 106, such as by deleting the content from the client 107 and storing a synchronization event to be executed when the client 107 is connected to the CPE 106 again (or comes within wireless range/communication).

As will be discussed elsewhere herein, one or more mechanisms may be put in place to ensure that the synchronization of the client 107 and CPE 106 includes synchronization only of content which either and/or both devices are entitled (e.g., authorized and authenticated) to access. In another embodiment, the synchronization may be instantiated in response to a signal received from the CPE 106 at the client 107. For example, a request for content may be received at the CPE 106 from a second client 107. In response to the second client 107 request, the CPE 106 determines that the content is unavailable, as it is currently disposed on (or being used by) the first client 107. The CPE 106 may generate a protocol message which is transmitted to the client 107 (such as via wireless transmission mechanisms). The message indicates that another user or device is requesting access to the content, and may either automatically begin the synchronization process discussed herein (FIG. 5) or enable the user of the first client 107 to select to begin synchronization or deny access.

Various logical rules for competing uses or requests for content will be recognized by those of ordinary skill given the present disclosure. For instance, a "first come first served" paradigm can be employed, where a first user (e.g., the first client device 107 in the example above) is given priority and the right to deny the second or subsequent requests, at least while the use rules are obeyed (e.g., during the access period, they have not exceeded their number of allotted play-outs, etc.) given to them for that content. Alternatively, a user or device profile can be used as the basis of priority; e.g., the second (requesting) user in the example above may comprise a user with a higher subscription tier or privilege, in which case the content is checked out from the first device and provided to the second client 107 (via the CPE 106). As yet another alternative, the check-in from the first client 107 may be delayed, so as to permit the first client 107 to complete a play-out in progress before synchronization with the CPE is performed, so as to not interfere with the user's experience when rendering the content.

Next at step 504 of the method 500, the CPE 106 determines whether the content for which the synchronization is requested is already available at the CPE 106. As noted above, if the content is present on the client 107 it will not be available at the CPE 106; hence, an inconsistency would indicate that the client 107 may have potentially illegally stored a copy of the content. The CPE 106 determines whether a false or unauthorized copy of content is present on the user's client 107 and reports the error or inconsistency to the network (step 506).

If the content is not available at the CPE 106 (i.e., it is marked as being "checked out" or unavailable), the method proceeds to step 508, where the marker on the CPE copy of the content is updated to reflect that it is now available.

Finally, at step 510 the client copy of the content is removed from storage at the client 107. Such removal may comprise (i) a complete removal or erasing of the content, or alternatively (ii) disabling the content so that it is inaccessible, unplayable, and/or uncopyable, and leaving the disabled copy on the client for possible later re-activation. For example, in one such implementation of the latter (ii), the CPE 106 may direct the client to encrypt the content file(s) using an encryption key generated or provided by the CPE 106; the client 107 does not retain the key, so in order to use the content, the same key must be again provided by the CPE 106 to unlock (decrypt) the file. Other schemes will be recognized by those of ordinary skill in the cryptographic arts given the present disclosure.

Similarly, the disabled client copy may be only partly disabled, such as where a "trailer" or preview capability is provided, but the broader content file cannot be accessed. For instance, the content may be provided with a trailer segment appended to its beginning or end, and this trailer segment is left unencrypted to that the user of the client 107 can access it unrestricted (yet not the content element itself). Alternatively, the "disabled" content element might have only a subset of available functions resident within the (unrestricted) content element, such as where a game allows the user only to view the game, yet not interact with it.

While the synchronization discussed herein includes deleting the version of the content stored at the client 107 and restoring the status of an original version of the content stored at the CPE 106, it is appreciated that in another embodiment, the original content (or the portable version thereof) may be physically moved back to the CPE 106 upon synchronization as well, much as one might move files from their USB flash drive to their PC (e.g., using the operating system of the CPE 106 or client 107 to effect a file "move" operation).

Figure 6A:
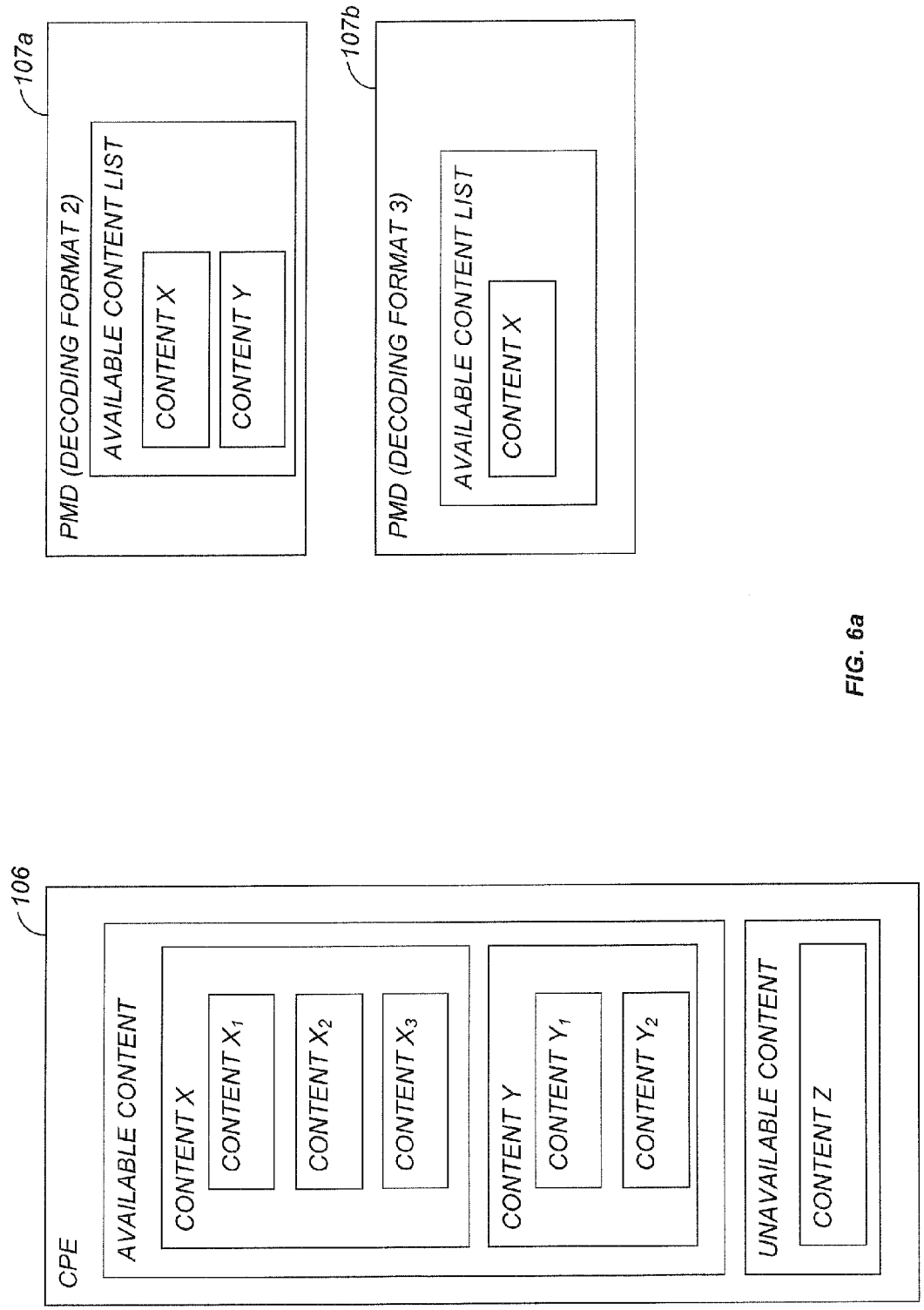
FIG. 6a is a block diagram illustrating generation of an exemplary available content list when the content is in a first state.
Figure 6B:
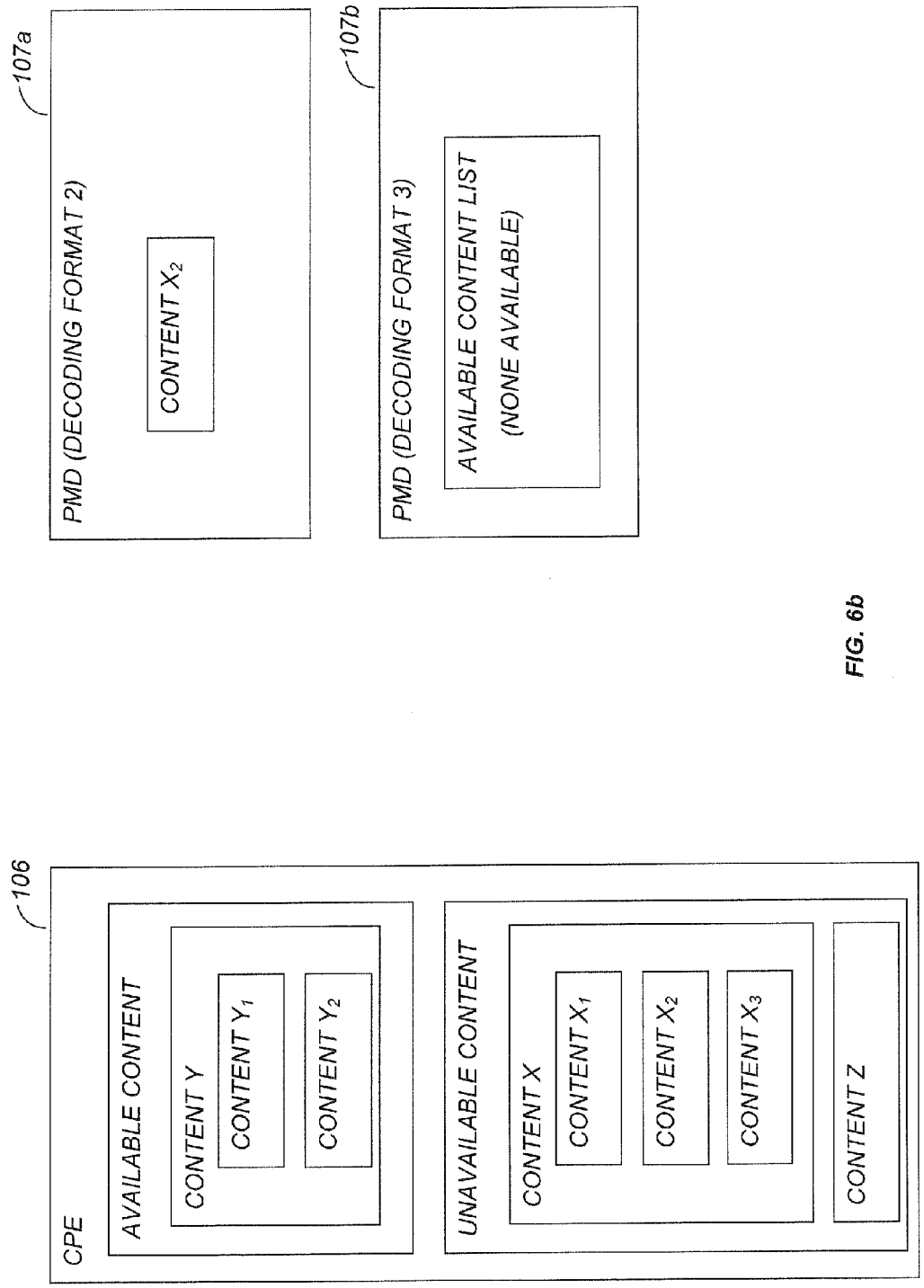
FIG. 6b is a block diagram illustrating generation of an exemplary available content list when the content is in a second state.

It is noted that, as illustrated in FIG. 6a-6b, in the instance several versions of content are present at the CPE 106, each of these versions is appropriately marked as "checked in" or "checked out" depending on the current status. While illustrated as being generated and maintained at the CPE 106, it is appreciated that in alternate embodiments, the available content list may be generated and maintained (e.g., status of content may be updated) at the content server 201 or other MSO network 101 entity, or even a non-MSO network 202 entity (e.g., third party Internet server).

FIG. 6a illustrates the generation of an available content list provided to each of the clients 107 in communication with the CPE 106. Although only two clients 107 are illustrated, it is appreciated that more or fewer may be utilized. It is further noted that other devices including e.g., a second CPE 106 may further be in communication with the illustrated CPE 106.

The available content list takes into account the capabilities of the client(s) 107. For example, a first client 107a is given which is only capable of decoding content in format version 2, whereas the second client 107b can only decode content in format version 3. Hence, the available content list for the first client 107a gives Content X and Content Y as both of these are available from the CPE 106 in a format the first client 107a is capable of decoding. The available content list for the second client 107b only lists Content X, as this is the only content available in an appropriate format for this device. The content listed in the available content lists further takes into account any content which is not currently available. Thus, because Content Z is not available, it is not provided in the available content lists. In another embodiment, a listing of this content may be provided to the client 107a, 107b indicating that the content exists at the CPE 106 (in an appropriate format) but is not currently available.

Turning now to FIG. 6b, suppose for example the first client 107a selects to receive Content X (in format version 2); this content will be provided thereto. Delivery of Content $X_2$ to the client 107a results in the content being marked as unavailable (or "checked out") at the CPE 106. Hence, each instance (Content $X_1$, Content $X_2$, and Content $X_3$) is moved to the Unavailable Content listing in the CPE 106. Furthermore, the available content list presented to the second client 107b is updated to indicate that Content X is no longer available.

As noted above, upon synchronization of the first client 107 to the CPE 106, the marker for Content X is updated to indicate it is available ("checked in"). Content X will reappear in the available content list for both clients 107, as previously illustrated in FIG. 6a.

Moreover, the present invention contemplates a "scheduling" function (e.g., software application resident on the CPE 106) that communicates with corresponding processes on the various clients 107 so as to provide a schedule of which content elements are available when. For instance, in one variant, the equivalent of an EPG display 650 is provided to a requesting user from the CPE 106 illustrating the availability of various content elements (e.g., movies, music, games, apps, digital books, etc.), as shown in FIG. 6c. In this implementation, the availability is shown as a function of time of day, although other display formats may be used with equal success. Moreover, the display 650 optionally includes coloration, shading and/or highlighting so as to provide a "quick glance" capability for the user as to what is available and what is not. Parenthetical designations 652 indicate which other family member (e.g., F=Father, M=Mother, S=Son, D=Daughter) or other device in the premises has the unavailable item "checked out" for convenience. Moreover, an optional reservation system is used, wherein a user can reserve content in advance, yet not check it out at that time. Such reserved content is visually differentiated 654 as shown in FIG. 6c, such as by color, font, blinking, etc., so that a user knows that the content is prospectively available, but is in a reserved status. In one implementation, the user can then "stack" a second or subsequent reservation on top of the existing one, so that if the first reservation is not completed (i.e., the content is not checked out), then they are next in line. An alert or notification to this effect can be sent to the second reserving user (device) if desired as well by the CPE 106 or other entity, so as to alert the user to the availability (or non-availability) of the content when the first reservation is implemented or cancelled, respectively.

In one embodiment, the apparatus and methods of co-owned, co-pending U.S. patent application Ser. No. 11/706,620 filed Feb. 14, 2007 and entitled "METHODS AND APPARATUS FOR CONTENT DELIVERY NOTIFICATION AND MANAGEMENT", which is incorporated herein by reference in its entirety. As discussed therein, when content is requested which is not currently available, a notification is accordingly sent to the subscriber to alert them of a potential unavailability of requested content. The subscriber may be offered the choice to either cancel the request or to accept delayed delivery of the requested content, for example. Numerous variants on this basic scenario are also disclosed, including inter cilia: (i) providing the subscriber with a projected delivery or availability time for the requested content (either via the requesting modality; e.g., set-top box and cable network interface, or via another communication channel); (ii) allowing the subscriber to specify a date and/or time of delivery, such as one convenient to them; (iii) providing the subscriber with a "content ready" notification when the content is actually ready for delivery; (iv) automatically programming or operating the subscriber's CPE or connected devices based on projected or actual delivery information. In yet another aspect, the content aforementioned notification apparatus and methods may be used for notification of subscribers or other parties of the availability of new content (e.g., recently released video, games, etc.).

In yet another embodiment, the aforementioned methods may be extended to a third or subsequent device. Hence, the client 107 which originally requested content may be configured to provide its copy thereof to another client 107 or other device, such as in a "daisy chain" configuration. In order to perform this functionality, the client 107 must be further configured to determine whether the target device to which the content is to be transferred is also associated with the same subscriber. This may be accomplished by querying the CPE 106 or other trusted source for a list of devices registered to the user (e.g., listed by MAC ID, SIM, digital authentication, etc.). Alternatively, the client 107 may query the requesting device for a customer identifier; i.e., independent of the identity of the requesting device. If the customer identifier of the requesting client 107 is the same as that of the first client 107, the content may be transferred. Various other mechanisms for determining the authority of the requesting client 107 to receive content from a first client 107 may also be utilized consistent with the present invention, whether occurring solely within the client 107 or utilizing one or more remote entities (such as the CPE 106, network entities, etc.). According to this embodiment, the same synchronization process is used from the third device (e.g., the client 107 which last received the content) to update the status of the content at the CPE 106 (i.e., make the content available again, "check-in").

Error Detection

As noted elsewhere herein, an aspect of the present invention provides for the movement of content between authorized devices while enforcing the content protection rules thereof. Hence, a mechanism for determining whether the usage/copy rules associated with content have been violated is useful to enhance the reliability of the system.

In one embodiment, the MSO network 101 becomes aware of potential copy protection rules violations by receiving messages regarding potential errors from the CPE 106 (i.e., a content error module of the application running on the CPE described elsewhere herein). According to this embodiment, when the CPE 106 (or other entity) creates the so-called "portable" version(s) of content for transfer to the client 107 (or other requesting device), these versions are marked with a device and/or user-specific tag. For example, a particular content element which is transmitted from the network to the CPE 106 has a $U_1D_1$ tag, indicating that it is specific to User 1 and Device 1 (the CPE 106). The portable version of the that content when it is subsequently transferred to a client 107 has a $U_1D_2$ tag, indicating that it is specific to User 1 (the same user as the CPE 106) and Device 2 (the client 107). Later, when that content is synchronized back to the CPE 106 and requested by another device, that version has a $U_1D_3$ tag, and so forth.

If, for example, the user of the client 107 which should only have content marked $U_1D_2$ illegally gains a copy of content from another device, that content will be incorrectly marked (such as by being marked with $U_1D_4$, or another designation which is inconsistent with the aforementioned scheme, or no designation at all). When the client 107 synchronizes to the CPE 106, the incorrect tag is noted, and an error message is transmitted upstream to the MSO network 101. It will be appreciated, however, that the client 107 may also possess a valid or authorized copy of the same content, yet obtained from another source (e.g., bought over the internet via an online store such as Amazon.com), which will have an "inconsistent" or missing designation. Hence, the presence of another copy on the client 107 is not de facto an indication of surreptitious reproduction, but rather requires further evaluation to determine its legitimacy.

In another implementation, supposing content marked $U_1D_2$ is transmitted to a first client 107, and the user of client 107 makes an illegal copy of the content. When the client 107 transmits a synchronization signal to the CPE 106 to unblock the original content at the CPE 106, it would appear that the only "available" copy of the content is that version at the CPE 106. However, when the client 107 re-synchs to the CPE 106 (such as to "check in" other content), the CPE 106 will examine the contents of the client 107 and note that the same content which is "checked in" at the CPE 106 (version $U_1D_2$) is also "available" at the client 107 (the illegal copy is also marked $U_1D_2$). A message indicating the same is then provided to the network. A network operator is then able to determine based on the message received from the CPE 106 what steps, if any, may be taken in response to the perceived illegal activities (e.g., further evaluation, suspension of subscription privileges, a block on further content provision, etc.).

The aforementioned methods and apparatus further enable a user to have content reinstated at the CPE 106 if, for example, the client 107 which had "checked out" the content is lost, stolen, non-functioning, etc. The network operator can rest assured that if the originally provided version is later revived (such as by being found, or begins functioning), it will be accounted for at the CPE 106 upon re-synchronization and appropriately deleted. Hence, these types of user device problems may be service while still affording a mechanism for avoiding multiple and/or illegal copies.

Content Server

Figure 7:
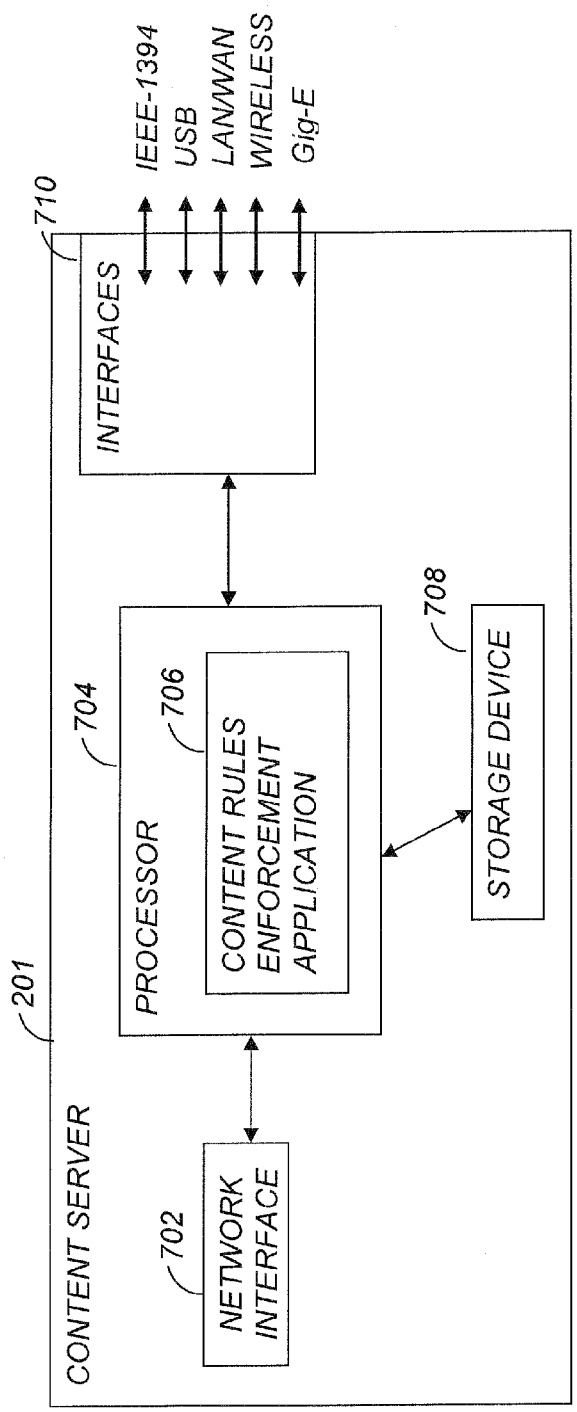
FIG. 7 is a functional block diagram illustrating an exemplary content server for use in the present invention.

FIG. 7 illustrates one exemplary embodiment of a content server 201 useful with the present invention. As shown, the content server 201 generally comprises a network interface 702 for interfacing with the content delivery network 101 and/or the non-MSO network 202, a processor 704, a storage apparatus 708 and a plurality of interfaces 710 for communication with e.g., the CPE 106, client 107, or other network (MSO network 101 and/or non-MSO network 202) entities. As discussed above, the other entities with which the content server 201 may be in communication, as well as the content server 201 itself, may be located at a network headend 150 (see FIG. 2), another portion of the MSO network, or alternatively at a non-MSO network 202 (see FIG. 2a).

In the illustrated embodiment, the server 201 comprises at least a content rules enforcement application 706 running on the processor 704 thereof. Although illustrated as a single application running on the server 201, it is appreciated that the foregoing content rules enforcement functionality may comprise a distributed application running on a plurality of entities in data communication with one another.

When a user or device requests content from the content server 201, the content rules enforcement application 706 is responsible for determining the appropriate copy, distribution, or use rules associated with the requested content. As noted above, these rules may be specific to the requesting subscriber or device, and/or to the requested content. In one embodiment, the rules enforcement application 706 may be configured to query network entities (such as billing entities, etc.) to determine a service level or tier for a requesting customer or device. This information may then be utilized to assign appropriate usage/copy rules to the content. Alternatively, the rules enforcement application 706 may simply receive usage/copy rules from a separate entity (such as the content provider, or another network entity charged with making the aforementioned determinations) either in response to a query or automatically. The rules enforcement application 706 maintains the usage/copy information and applies the appropriate information to the requested content prior to transmission thereof to the requesting subscriber.

The rules enforcement application 706 may be further utilized to enforce copy or use rules when an error message is received from the client devices. As discussed elsewhere herein, if, during the synchronization process (see FIG. 5) it is determined that content exists and is "available" simultaneously on both a receiving device (e.g., a PMD 106) and the transferring device (e.g., the CPE 107), the content was inappropriately copied (assuming the rules specify that only one version may be in use at any given time). When this occurs, an error message is generated at the device and transmitted to the copyright rules enforcement application 706 of the content server 201. The rules enforcement application 706 is configured to determine whether the error message is indicative of a copyright infringement act, or is merely some other non-infringement related error. The rules enforcement application 706 optionally notifies a system administrator in the instance that it is believed that an act of copyright infringement has occurred.

In yet another embodiment, the rules enforcement application 706 may be further configured to generate an available content list, which is downloaded to the CPE 106. The copyright rules enforcement application 706 stores a list of available content for each CPE 106 (or subscriber). The list of available content may be linked to the subscriber's account, such that only that content which is stored at a subscriber-specific portion of a network content storage entity (e.g., the aforementioned "network DVR" or "virtual DVR") may be accessed by the CPE 106 (or client 107). The rules enforcement application 706 further limits the accessible content to that content for which the usage/copy rules permit the request. According to this embodiment, the rules enforcement application 706 is configured to receive synchronization signals (as discussed above with respect to FIG. 5) in order to maintain the available content list, such as by updating the status of the content as "available" or "checked-in" and "unavailable" or "checked-out".

Still further, the content listed in the available content list may further include content which is selected by a network entity (such as content selected by the recommendation entity discussed in co-owned, co-pending U.S. patent application Ser. No. 12/414,576 filed on Mar. 30, 2009 and entitled "RECOMMENDATION ENGINE APPARATUS AND METHODS", which is incorporated herein by reference in its entirety), and/or content selected to be "start-over" content (as is discussed in co-owned, co-pending U.S. Patent Application Publication No. 2005/0034171 filed on Aug. 6, 2004 and entitled "TECHNIQUE FOR DELIVERING PROGRAMMING CONTENT BASED ON A MODIFIED NETWORK PERSONAL VIDEO RECORDER SERVICE", which is incorporated herein by reference in its entirety).

Consumer Premises Equipment (CPE)

Figure 8:
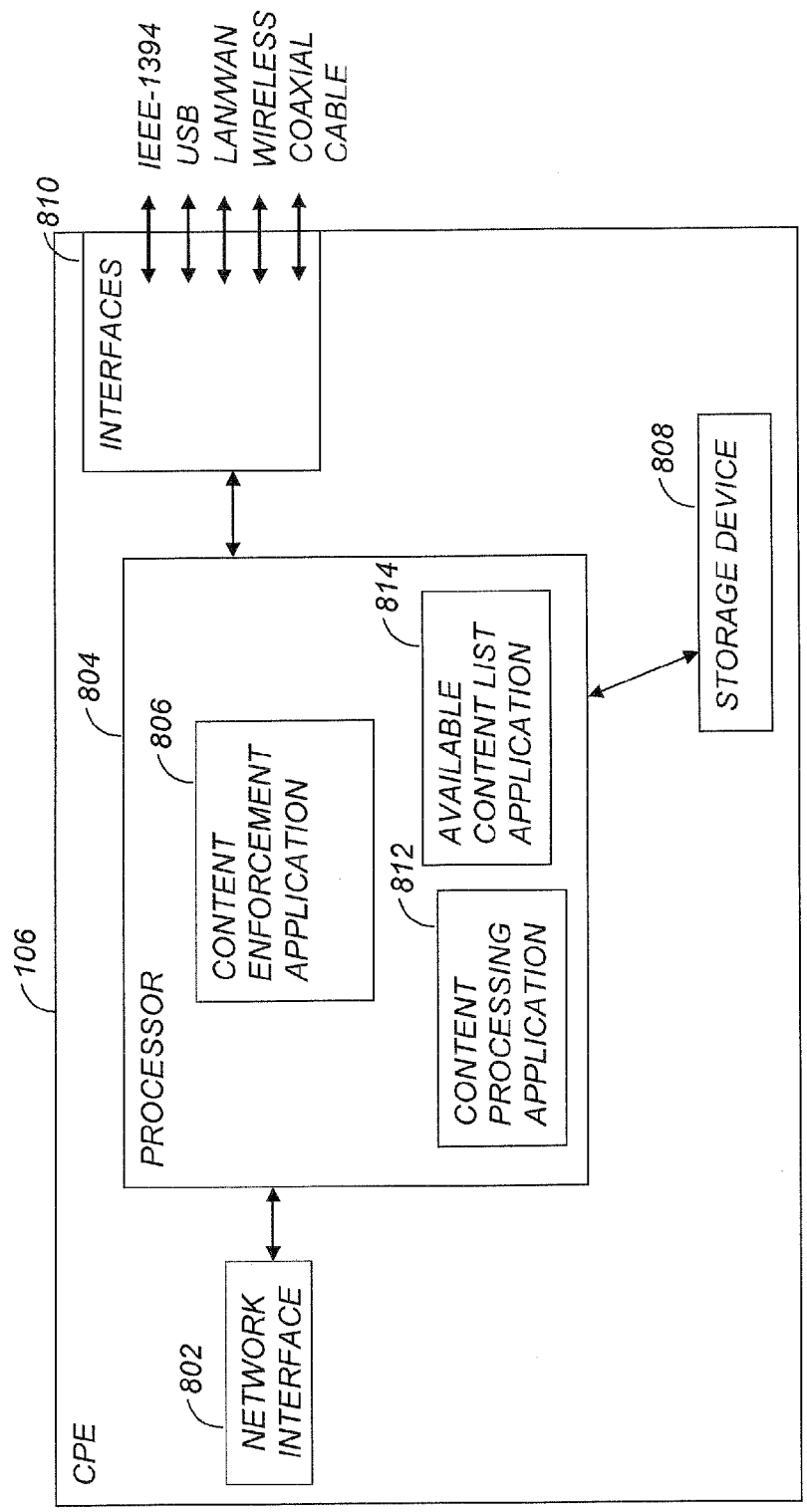
FIG. 8 is a functional block diagram illustrating an exemplary client device for use in the present invention.

FIG. 8 is a block diagram illustrating an exemplary user device for use in the present invention. Although illustrated as a consumer premises equipment (CPE) 106, it is appreciated that the client devices 107 may have similar components and functionality. As discussed above however, a CPE 106 may be utilized to provide content to additional devices associated with a single subscriber.

As illustrated, the exemplary CPE 106 of FIG. 8 includes a first interface 802 for communication with a network. The CPE 106 may communicate with the content delivery network 101, and/or with a non-MSO network 202. The CPE 106 requests and receives content via this interface 802. The CPE 106 further comprises a digital processor 804 and a content processing application 812, a storage device 808, and a plurality of back-end interfaces 810 for communication to a plurality of additional subscriber devices (e.g., other CPE 106, clients 107, etc.).

The storage device 808 of the CPE 106 may be configured to store a plurality of available content thereon, including the same content in various formats (e.g., a mobile or compressed format). The storage device 808 further store one or more computer applications which are run on the aforementioned processor 804. The storage device 808 may comprise for example a random access memory (RAM), a hard disk drive, an optical drive (e.g., CD-ROM or DVD), NAND flash memory, or some combination thereof.

The processor 804 is configured to run at least a client content enforcement application 806, a content processing application 812, and an available content list application 814 thereon. The enforcement application 806 is responsible for enforcing usage/copy/distribution rules for the content when it is transmitted subsequently to other devices. For example, when the CPE 106 receives a request for content from e.g., a client 107, the enforcement application 806 determines whether transfer of the requested content is within the usage/copy rules for the content. In other words, the enforcement application 806 of the CPE 106 reviews the usage/copy rules received alongside the content and utilizes information contained therein to determine whether the content may be transferred to second device (e.g., client 107). As indicated above, transfer of content may not necessarily result in the actual movement of the requested content from the CPE 106 to the client 107, but in some instances may comprise a mobile copy of the content to be created (e.g., a copy which is suited to the capabilities of the requesting device) and transmitted to the client 107, while the original copy remains at the CPE 106 but is rendered "unavailable" while the mobile copy is in use (i.e., present on the client 107, termed "checked out").

The enforcement application 806 of the CPE also determines whether content is "available" prior to transferring content (including a mobile version thereof) to the second device. As discussed above, in one embodiment, all copies of a particular content stored at the CPE 106 are labeled "unavailable" when one copy of the content is transmitted ("checked out") to a client 107 and has not yet been synchronized back ("checked in"). Hence, the enforcement application 806 may be utilized to determine, upon receipt of a request for content, whether the requested content is currently available. The enforcement application 806 may do this by, e.g., querying the storage entity on which the content his held for the status of the requested content.

The enforcement application 806 may further be configured to maintain accurate status records of the content. The enforcement application 806 is responsible for updating the status markers on the content stored at the CPE 106. For example, when the mobile version of a first content is transmitted to a first client 107, the enforcement application 806 marks all remaining versions of that content stored at the CPE 106 as being "unavailable" (as illustrated in FIG. 6b). Next, when the client 107 synchronizes back to the CPE 106, once the content is deleted from the client 107, the enforcement application 806 updates all versions of that content as now being "available".

The content processing application 812 is utilized at the CPE 106 to generate multiple copies of content under the direction of the enforcement application 806. As noted elsewhere herein, the CPE 106 may generate additional copies of content which are tailored to match the capabilities of a requesting device, such as by changing their encoding, bitrate, resolution, etc. In one embodiment, the number and types (e.g., codecs) of additional copies which are permitted (e.g., by the enforcement application 806) to be generated are determined based on the devices which are registered to the CPE 106 and/or network, and are associated with the same subscriber as the CPE 106. The content processing application 812 generates a version of the requested content specifically suited for the requesting device upon request for the content from the device. That version is provided to the client 107. Subsequently, when the client 107 synchronizes to the CPE 106, the client 107 deletes its version of the content, and the version(s) of the content at the CPE 106 are restored as "available".

However, it will be appreciated that in another embodiment, a network (e.g., MSO or non-MSO network) entity may be responsible for generating multiple copies of the content. The copies may be based for example on the devices registered to the subscriber, and/or on a subscription level or tier of the subscriber.

An available content list application 814 is also run on the processor 804 of the CPE 106. The available content list application 814 utilizes information gained from the current status of the content stored at the CPE 106 (and/or associated to the subscriber at the network) to generate a list of available content for display to the subscriber devices. The available content list application 814 may further be configured to tailor lists to the specific capabilities of the device on which the list is displayed. For example, referring again to FIGS. 6a-6c, the available content list application 814 will generate an available content list for the client 107 capable of only decoding format 3 which only includes content for which format 3 is available. Hence, Content Y, which is not available in format 3, is not listed in the available content list on that client 107.

It will be appreciated, however, that in another embodiment, a network (e.g., MSO or non-MSO network) entity may be responsible for generating the available content list. The list may be generated based on signals received from the CPE 106 regarding the status of particular ones of content elements.

The CPE 106 further comprises a plurality of back-end interfaces 810 for communication to a plurality of additional subscriber devices (e.g., other CPE 106, client 107, etc.). As illustrated, the CPE 106 may communicate via any number of available technologies. Suitable interfaces include for example USB, Wi-Fi, FireWire (1394), MoCA, Bluetooth, IEEE 802.3, HDMI, DisplayPort, or any number of other adapted for digital data transfer and signaling.

As discussed previously, one implementation of the CPE 106 of the present invention may comprise a media bridge of the type disclosed in the previously referenced commonly owned, co-pending U.S. patent application Ser. No. 12/480, 597 entitled "MEDIA BRIDGE APPARATUS AND METHODS".

It will also be further recognized that the particular CPE 106 configuration shown in FIG. 8 is for illustrative purposes, and various other configurations of the CPE 106 are consistent with the invention. For example, the CPE 106 may not include all of the elements shown in FIG. 8, and/or may include additional elements and interfaces such as for example an interface for the HomePlug A/V standard which transmits digital data over power lines, specialized networking or security processors, a PAN (e.g., 802.15), Bluetooth, or other short-range wireless interface for localized data communication, a longer range WLAN or Wi-MAX (IEEE Std. 802.16) interface, etc.

In another embodiment, the CPE 106 includes a display or other user interface element capable of displaying one or more indications, such as LEDs, LCDs, monitors, etc. A "soft" display (e.g., TFT or LCD display having software generated indications) may be used on the CPE 106 (or a remote device in communication therewith, such as a wireless remote control) to provide a flexible display environment. Moreover, the methods and apparatus of co-owned and co-pending U.S. patent application Ser. No. 10/773,664 filed Feb. 6, 2004 entitled "METHODS AND APPARATUS FOR DISPLAY ELEMENT MANAGEMENT IN AN INFORMATION NETWORK", incorporated herein by reference in its entirety, may be used within the CPE 106 or other communicating devices (e.g., client 107). Specifically, display elements such as GUI windows or discrete indicators in a client device running multiple related or unrelated applications can be managed and controlled. In one embodiment, an improved window management entity is provided within the device with which HAVi-compliant application(s) can interface in order to access display elements according to a priority structure or hierarchy. One or more privileged applications are designated and allowed to affect the priority structure, including requesting a new in-focus application to be placed atop the priority structure. The network operator can also optionally control the operation of the window manager remotely via a network agent.

The CPE 106 may also include a MoCA-compliant IC or chipset, such as the exemplary c.link® EN 2510 device manufactured by Entropic Communications of San Diego, Calif., so as to facilitate networking of content (such as HD content) over coaxial cabling within the premises, as described in greater detail elsewhere herein.

The CPE 106 may further provide a mechanism to identify new CPE 106 and/or client 107 on the network, and grant or deny content thereto based on, e.g. conditional access privileges or business rules. This may or may not extend to the available content list service on the client 107; i.e., devices may be able to view the list of available content, but not access the actual content or transfer/copy them.

In another embodiment, the CPE 106 has associated therewith a DVR or other recording and/or storage apparatus which can be used to backup or store content, media, or data files. This device may be external to the CPE 106, or incorporated within the form factor thereof (including for example removable media). The CPE 106 may also be configured to detect newly uploaded content, and/or changes made to stored content, and make this new or upgraded content available to the other subscriber devices (e.g., other CPE 106, client 107). This content "refresh" process can be event- or occurrence-driven (e.g., upon the occurrence of a given event such as receipt of a user-initiated "update" or "refresh" operation), invoked periodically (e.g., every X minutes), when new content and/or devices are detected (such as new CPE 106 and/or new PMD 202), or according to any number of other different schemes.

Premises Networking

In yet another embodiment, the CPE 106 may also create a premises network 200 (such as a Local Area Network (LAN) utilizing the existing coaxial cable or CAT-5 cable in a home) for communication between the various devices associated with a subscriber. For example, an Ethernet-over-coax based technology allows services to be delivered to other devices in the home utilizing a frequency outside (e.g., above) the traditional cable service delivery frequencies. See also the MoCA (Multimedia over Coax) alliance and MoCA Standard Versions 1.0 and 1.1, which are incorporated herein by reference in their entirety, which describe OFDM-modulated radio frequency signals on the order of 1 GHz delivered over extant coaxial cable systems. Accordingly, one embodiment of the invention uses frequencies on the order of 1150 MHz to deliver data and applications to other devices in the home such as PCs, laptop computers, other PMD, media extenders, and set-top boxes. The coaxial network is merely the PHY or bearer; devices on the network utilize Ethernet or other comparable networking protocols over this bearer to effectuate local area networking.

In one embodiment, the home network is established according to the OpenCable™ Application Platform (OCAP) Specification: OCAP Home Networking Extension protocol (OC-SP-OCAP-HNEXT-I03-080418, dated Apr. 18, 2008), incorporated herein by reference in its entirety. As disclosed therein, content may be shared among a plurality of networked CPE 106, described herein. Accordingly, content may be shared among all the CPE 106 via an Ethernet-over-coax topology, or another interface of the various CPE 106 and the client 107.

In the embodiments illustrated at FIGS. 2 and 2a herein, various clients 107 are adapted to receive content from, and transfer content to, a CPE 106 (such as an STB, digital set-top box or DSTB, etc.) or device connected thereto such as a DVR (not shown).

As noted previously, content from the CPE 106 may be stored on an internal mass storage device thereof and/or another connected device (e.g., RAID, DVR, etc.) thereto, or may be transmitted directly from storage to the requesting or target device. In one embodiment, content is securely delivered to any viewing location in the premises network 200 that shares a common security model via the various PHY interfaces available, including e.g., Wi-Fi, USB, 1394, and Ethernet.

In yet another embodiment, the CPE 106 and/or client 107 may utilize UPnP A/V to access the content listed in other CPE 106 directories.

The exemplary CPE 106 may also act as a Wi-Fi node or access point (AP), thereby allowing Wi-Fi enabled clients 107 such as smartphones or laptop computers to connect to thereto, and access content therefrom. It will be recognized, however, that the CPE 106 may also act as a slave or station (STA) within an ad hoc or other Wi-Fi network, such as where another device on the premises acts as the AP. The CPE 106 can include this Wi-Fi capability in a dedicated radio suite (e.g., one or more ICs or ASICs), as part of a larger SoC device, as a Wi-Fi card, or even as an external device in data communication with the CPE 106 or other associated device (e.g., plugged into an external slot or port of the CPE 106, such as a USB or 1394 interface).

The Wi-Fi interface may further provide Wired Equivalent Privacy (WEP), Wi-Fi Protected Access (WPA) and/or WPA2 encryption services of the type well known in the art on one or more wireless connections. The interface also may support other protocols, such as the Extensible Authentication Protocol (EAP)/802.1x Std. for authentication (e.g., using a RADIUS server or the like). Similarly, CPE 106 can be configured for other types of secure network or tunneling capabilities, such as the Wireless Transport Layer Security (WTLS) layer in a Wireless Application Protocol (WAP) stack (e.g., where the CPE 106 acts as a WAP gateway or proxy), or virtual private networking (VPN). Media Access Control (MAC)-level filtering may also be utilized.

In one embodiment, the Wi-Fi interface provides service over substantially all of the premises where it is used; however, other schemes for providing additional coverage can be used as well (such as "daisy-chaining" APs together, etc.). The interface's operating channel is set automatically by scanning for a free channel and initializing the access point on that channel.

In one embodiment, the CPE 106 can automatically discover all DLNA-capable clients (e.g., client 107, CPE 106, etc.) during boot up or other events, and present the available content from the CPE 106 content directory (DLNA CDS) to them. The CPE 106 may also be adapted to automatically start a DLNA-compatible media server (which has a UPnP Content Directory Service) at boot using only the aforementioned Ethernet, MoCA and/or Wi-Fi network interfaces. The CPE 106 reads the content directory from the media device (such as e.g., reading all the content over the Accessory Serial Protocol), and builds a local database of that content. The CPE 106 then publishes the content to its digital media server, in order for any digital media player (e.g., client 107) to see the content. Once specific content is selected by a media player for playback, the CPE 106 utilizes the aforementioned content enforcement methods to control delivery of the content thereto (and return of the content if required). If appropriate for transfer, the CPE 106 then generates an encoded/transcoded copy of the content (e.g., "portable copy") which is transmitted over e.g., UPnP AV as per DLNA to the client 107 in a DLNA defined Media Format.

In yet another embodiment, the CPE 106 may further act as a quality-of-service (QOS) policy enforcement point in the premises network 200. For example, the CPE 106 may receive and honor policy enforcement configuration files from the head-end 150 or other provisioning system. An IEEE Std.802.1p tag or similar mechanism can be used to identify QOS priority. The CPE 106 can configure the MoCA, Ethernet and other relevant interfaces to recognize and utilize the data of these defined priorities in the proper or specified order. For instance, in one variant, the user can specify which of the different content types/delivery paradigms is most important, or rank them, such that user experience is optimized when receiving appropriately encoded or tagged data.

Content Provisioning

As discussed above, the CPE 106 receives content from a content server 201 (e.g., via the MSO network 101, or non-MSO network 202) and subsequently transcodes the content into a format understood by the requesting device (e.g., client 107) if required. The present invention may be utilized with various types of clients 107, thus the CPE 106 may be adapted to convert the content into various content formats including, inter alia, AVC, H.264, MPEG2, etc. In one embodiment, content is received from the content server 201 in MPEG2 or MPEG4 encoded format, and translated to a format suitable for the client 107 if required (e.g., to H.264/MPEG-4 Part 10 or AVC (Advanced Video Coding), Windows Media Player, Real, etc.).

In order to provision content for transmission to a client 107, the CPE 106 first determine the type of client 107 connected (via either wired or wireless methods), and note the content format(s) that the client 107 is capable of receiving. In order to determine the formats a client 107 is capable of receiving, the CPE 106 may generate and store a database associating each type of client 107 to appropriate capability information. It is further appreciated that a UPnP device may advertise its capabilities including resolution and video decoding capabilities. In this instance, the CPE 106 can easily determine which transcoder to use for each targeted device.

Also, as noted above, the CPE 106 can tailor the list of available content to the requesting device based on device capabilities and available formats of content.

The client 107 user may then select content for delivery from the available content list. The CPE 106 decrypts the content as required, decodes the content, re-encodes the content to the previously determined compatible format, re-encrypts the content if required, and transmits it to the client 107. As discussed above, the CPE 106 has previously determined the type of client 107 connected (or at least its capabilities with respect to the requested content), and thus makes a decision regarding the suitable format based on the client 107 type.

If the content is sent to the client 107 encrypted, a mechanism for decryption key generation and/or provision is needed. In one embodiment, the encrypted content is protected using DRM capabilities (e.g., Windows Silverlight®), such that the client device merely need possess the same DRM as the CPE 106. Alternatively, the CPE 106 can be vested with encryption key generation capability, such as via possessing a secure microprocessor (SM) that can generate encryption key pairs for use as part of a public/private key pair. See the discussion of "trusted domains" provided subsequently herein for exemplary implementations.

In the event that the CPE 106 has no a priori knowledge of the client capabilities, and the client does not advertise or provide such information directly, the CPE 106 may utilize a "dumb" approach; e.g., transmitting the most likely or most popular encoding to the client, 107, and awaiting feedback from the client as to the suitability of the transmitted encoding. If the client cannot decode the first version sent, an error message is generated and sent back to the processing application on the CPE 106, which reads this message and then transmits the content in a second format according to a hierarchy or other rule set (after removal or disabling of the first version). This process continues until no error messages are received (or an "ACK" indicating suitable decoding is received).

The aforementioned content protection methods are also implemented at the CPE 106. For example, as noted above, the CPE 106 is adapted to read and respect the copy protection data of the content (e.g., protection bits as indicated in the DTCP over IP copy protection field as set forth in the Open-Cable™ Specification—Home Networking Security Specification (OC-SP-HN-SEC-D01-081027 dated Oct. 27, 2008, incorporated herein by reference in its entirety)). In other words, the CPE 106 determines whether the content may transmitted to the client 107 (i.e., if the content is "available") or whether it may not be transmitted (i.e., if the content is "unavailable"). The CPE 106 also updates the status of content as being "checked-out" or "unavailable" once it is transferred to the client 107.

In yet another embodiment, the CPE 106 is configured to store a plurality of device profiles therein. In one variant, a user registers his/her devices to the CPE 106, the CPE 106 then stores profile information for each of the devices. The profile contains information related to the media formats operable on the device and the device identity. For example, when a user connects a Zune device to the CPE 106, the device may indicate to the CPE 106 that it may only receive content rendered in Windows Media format. The CPE 106 then uses the profile to determine translation/transcoding of content to be sent to the client 107 as discussed above. The CPE 106 can also learn from the various devices it is connected to; i.e., collect device-specific profiles and assemble a library or database of such profiles for future use. For instance, one embodiment of the bridge is configured to remember specific user client 107 or device profiles (e.g., Joe's laptop), and utilize these profiles subsequent to first acquiring them, in order to determine media encoding/transrating/security requirements and permissions. Alternatively, platform-specific and user-generic profiles or templates (e.g., an iPod, irrespective of ownership or specific configuration) can be used by the CPE 106.

Alternatively, one variant of the invention utilizes the MAC address of the client 107 to enter a look-up table (or network query) as to the type of device associated with that address; the device configuration can then be determined by accessing a device profile.

The CPE 106 may also consult a headend or network entity to determine the device profiles associated with devices in the subscriber's account.

Trusted Domain

It will further be recognized that the present invention can be used in conjunction with a so-called "trusted domain" for content and other data protection if desired. Exemplary trusted domain apparatus (and methods) are described in co-owned and co-pending U.S. patent application Ser. No. 11/006,404 filed Dec. 7, 2004 and entitled "TECHNIQUE FOR SECURELY COMMUNICATING PROGRAMMING CONTENT", as well as U.S. patent application Ser. No. 10/894,884 filed on Jul. 20, 2004 of the same title, each of the foregoing being incorporated herein by reference in its entirety, although other approaches may be used consistent with the present invention. These applications disclose, inter cilia, a multi-layered rights arrangement to prevent unauthorized use and transfer of protected content, especially in a premises network 200. For example, the network may be considered to comprise multiple layers. One such layer may be a "trusted domain," described in aforementioned U.S. application Ser. No. 10/894,884. For example, in a managed network system, the trusted domain might include not only the system portion where programming content traditionally is secured by (and within total control of) a network operator, including, e.g., the head-end, delivery network, etc., but also user devices, e.g., DSTBs, or other CPE 106, at subscribers' premises which are capable of receiving and securely storing programming content in a prescribed manner. The network operator can control certain subscriber access and usage with respect to content held within the trusted domain. For example, movie content held within a network operator's trusted domain (e.g., on a hard drive of an STB or CPE) cannot be distributed over the Internet in viewable form, and cannot become a source for duplication of multiple viewable copies.

A second layer of the network may be defined as being outside the trusted domain. A device in the second layer is assigned an indicator indicating an extent of security of the device. For example, when the device in the second layer (e.g., client 107) requests transfer of protected content from a device in the first layer (e.g., CPE 106), the first layer device authenticates the second layer device to determine legitimacy of the device for receiving the protected content. After the second layer device is authenticated, the first layer device transfers not only the protected content, but also a set of rules associated with the protected content as previously described. At least some of the rules in the set are associated with the indicator and applicable to the second layer device with respect to use of the protected content.

The foregoing disclosures broadly encompass the concept of the multi-layered rights arrangement including the trusted domain for preventing unauthorized use of protected content. It will therefore be appreciated that the present invention is not limited to use of specific devices in the arrangement. For example, the invention may also apply to a host device connected to a CableCARD module, jointly realizing the functionalities of a DVR STB or CPE. In one implementation, a CPE 106 has programming content, which is encrypted, stored in storage therein. The CPE 106 receives a request from the client 107 for accessing the programming content. The request includes a data package stored in association with the encrypted programming content in the storage. In response to the request, the CPE 106 determines that the client 107 is allowed to access the programming content based on information (e.g., usage rights information) in the first data package. The CPE 106 then utilizes data concerning a cryptographic element (e.g., an encryption key) for decrypting the encrypted programming content in the storage to provide the client 107 with access to the programming content.

So-called "DCAS" systems (downloadable conditional access systems) may also be used consistent with the invention in order to define/enforce trusted domains within the premises network 200. See, e.g., the exemplary DCAS apparatus and methods described in co-owned and co-pending U.S. patent application Ser. No. 11/584,208 entitled "DOWNLOADABLE SECURITY AND PROTECTION METHODS AND APPARATUS" filed Oct. 20, 2006, incorporated herein by reference in its entirety.

The CPE 106 may also contain a secure microprocessor (e.g., security processor; not shown) which supports the trusted domain (such as, e.g., the Time Warner Cable Authorized Service Domain (ASD)). The bridge CPE 106 can transfer content from the Authorized Service Domain (ASD) to the DRM license domain for content viewed on the various CPE 106 and client 107. One exemplary ASD configuration useful with the present invention is described in co-owned and co-pending U.S. patent application Ser. No. 11/592,054 entitled "METHODS AND APPARATUS FOR PREMISES CONTENT DISTRIBUTION" filed Nov. 1, 2006, incorporated herein by reference in its entirety.

The CPE 106 may also provide translation from different encryption environments if required, such as from 3DES to the AES cipher.

The CPE 106 may be further configured to receive and store security packages associated with encrypted content from the content server 201. The CPE 106 delivers these security packages (and content) to the client 107 and/or CPE 106 for playback. For example, encrypted content and security packages may, via the CPE 106, be delivered to a client 107, etc. The CPE 106 may also be configured to be resistant/resilient to denial of service attacks on all WAN, WLAN and HLAN interfaces.

Business/Operational Rules Engine

In another aspect of the invention, a processing entity rendered as one or more computer programs disposed on a headend server or entity (e.g., content server 201), at the CPE 106, or other location includes a so-called "rules" engine. This engine comprises, in an exemplary embodiment, one or more software routines adapted to control transmission of content within the usage/copy rules discussed herein (and in some cases the operation of e.g., the content server 201, the CPE 106, and/or the client(s) 107) in order to achieve one or more goals relating to operations or business (e.g., profit). Included within these areas are network optimization and reliability goals, increased maintenance intervals, increased subscriber or user satisfaction, increased subscription base, higher profit (e.g., from increased advertising revenues), more subscriber "views" of given content, broader distribution of content (including to mobile devices that would not otherwise be served by the network), and so forth.

These rules may comprise a separate entity or process, and may also be fully integrated within other processing entities (e.g., the content rules enforcement application 706), and controlled via a device connected to the CPE 106 or content server 201, or a remote node such as one disposed at the headend 150 of the distribution network. In effect, the rules engine comprises a supervisory entity which monitors and selectively controls the CPE 106 (and optionally premises network 200 and/or the content server 201) operation processes at a higher level, so as to implement desired operational or business rules. The rules engine can be considered an overlay of sorts to the more fundamental algorithms used to accomplish required network operation, such as IP address assignment, and so forth.

For example, the CPE 106 or content server 201 may invoke certain operational protocols or decision processes based on direct or indirect user inputs to the CPE 106 (or content server 201), conditions existing within the network (such as the MSO network 101, the non-MSO network 202, and/or the premises network 200), demographic data, geographic data, etc. However, these processes may not always be compatible with higher-level business or operational goals, such as maximizing profit or system reliability. Hence, when imposed, the business/operational rules can be used to dynamically (or manually) control the operation of the CPE's enforcement application 806, the content processing application 812, the available content list application 814, the rules enforcement application 706 of the server 201, and/or other devices within the premises (such as other CPE 106 and/or clients 107). The rules may be, e.g., operational or business-oriented in nature, and may also be applied selectively in terms of time of day, duration, specific local areas, or even at the individual user level (e.g., via specific identification of the CPE 106 or client 107 via TUNE_ID, MAC address, or the like).

One rule implemented by the rules engine may comprise enabling the transfer of content between subscriber devices according to a subscriber class. For example, a first class of subscriber may only be permitted to transmit content to a limited number of additional devices (e.g., client 107), or to an unlimited scope of devices yet for only a limited number of instances, whereas a second class of subscriber may be permitted to transmit to a larger number of additional devices and/or to an unlimited number of devices registered to that subscriber, or an unlimited number of times. Similarly, the transmission of requested content may also be controlled to only subscribers meeting certain criteria. Hence, if the requesting device does not possess a required codec, CA/encryption keys, or network interface of sufficient bandwidth, it may not receive the content.

In another embodiment, the rules may indicate that a subscriber class may define the types of content which may be transferred between devices. For example, upper-tier subscribers would be able to transfer premium content (e.g., movie content, pay per view content, content from a predetermined set of "premium" channels, games, apps, etc.), whereas lower tier subscribers would be restricted to transfer only non-premium content, and/or only of a particular type such as movies or music.

In yet another embodiment, the transferred content may be given an expiration date/time. That is to say, a limit may be set as to how long content may be "checked out" from the CPE 106 to a client 107 (or second CPE 106). Once the time limit expires, the content may be automatically deleted from the device, and a synchronization signal automatically sent to the CPE 106 to restore the content (e.g., "check in" the content).

Another rule implemented by the aforementioned rules engine may comprise an automatic deletion (and synchronization) of content after the content has been viewed. This may be implemented by placing an indicator or flag at the end of the content play-out, which may be placed thereon by the CPE 106 content processing application 812 prior to transmission of the content. When the flag is reached, the client 107 is signaled to delete the content and begin the synchronization process discussed above in order to restore the content at the CPE 106 from which the content was received.

In a still further embodiment, the rules engine may be configured to cause certain functions to be disabled when content is moved from the CPE 106 to another device (e.g., client 107). This may include so-called "trick mode" operations, such as fast forward, rewind, pause, etc. In one variant, the functions may be disabled for certain types of requesting devices, types of content (e.g., "premium" content), and/or for certain subscribers (i.e., non-premium subscribers), etc.

Further, the rules engine may pre-define a number of playouts that "moved" content may have. For example, the portable version of a particular content may only be permitted to be played twice before the client 107 is triggered to delete the content and synchronize to the CPE 106. It is noted that the deletion and synchronization steps for this, and other rules discussed herein, may be temporally separated (particularly if the synchronization requires actual connection of the client 107 to the CPE 106). Hence, as noted previously, the client 107 may be configured to store a synchronization event which is executed at a later time. In the interim, the content will not be available on either the client 107 or the CPE 106 (or may be partially disabled), thus encouraging the user to synchronize the devices.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of providing content from a first subscriber device to a second subscriber device, said content having one or more content protection rules associated therewith, said method comprising:
    collecting information regarding whether individual ones of a plurality of copyright protected content may be transferred to said second client device;
    utilizing said collected information to generate a user selectable available content list; and
    providing said list to said second client device;
    receiving at said first subscriber device a request for said content from said second subscriber device;
    determining whether said content is available;
    when said content is unavailable, not providing access to said content to said second subscriber device; and
    when said content is available:
        determining whether said request may be filled, said determination based at least in part on said one or more content protection rules associated with said content;
        generating a copy of said content based at least in part on capabilities information received from said second subscriber device;
        marking said content as temporarily unavailable for subsequent requests; and
        providing said copy of said content to said second subscriber device.

2. The method of claim 1, wherein said act of determining whether said content is available comprises consulting a table comprising a plurality of content and a status identifier for each of said plurality of content.

3. The method of claim 2, wherein said act of marking said content unavailable for subsequent requests comprises changing a status of said content in said table.

4. The method of claim 1, wherein said act of determining whether said content is available comprises determining whether said content is present at said second subscriber device.

5. The method of claim 1, wherein said method further comprises, when said content is present at said second subscriber device, not providing access to said content to said first subscriber device.

6. The method of claim 1, wherein said copy of said content comprises a copy specifically formatted to be compatible with capabilities of said second subscriber device.

7. The method of claim 1, wherein said act of marking said content unavailable comprises marking said content unavailable for transfer from said first subscriber device and for playback at said first subscriber device.

8. The method of claim 1, further comprising:
    receiving a signal from said second subscriber device;
    causing said second subscriber device to delete said copy of said content stored thereon; and
    marking said content available at said first device.

9. A consumer premises device (CPE) configured to provide copyright protected content to a plurality of client devices in communication therewith, said CPE comprising:
    a first interface configured to receive said copyright protected content from a network and at least one rule for the transfer or use thereof;
    a storage device;
    a processor, said processor configured to run at least one computer application thereon, said computer application comprising a plurality of instructions which are configured to, when executed:
        collect information regarding whether individual ones of a plurality of copyright protected content may be transferred to said first client device;
        utilize said collected information to generate a user selectable available content list;
        provide said list to said first client device
        receive a request for said copyright protected content from a first client device;
        determine whether said copyright protected content may be transferred to said first client device;
        generate a copy of said copyright protected content; and
        cause said content to be marked as unable to be used by said CPE and unable to be transferred to second ones of said plurality of client devices;
    and
    a second interface configured to transmit said copy to said first client device;
    wherein said second interface is further configured to receive said user selection of said copyright protected content from a user of said first client device; and
    wherein said copy of said copyright protected content is generated based at least in part on capabilities information received from said first client device.

10. The CPE of claim 9, wherein said determination of whether said copyright protected content may be transferred to said first client device comprises a determination of whether transfer is compliant with said at least one rule for transferor use thereof.

11. The CPE of claim 9, wherein said determination of whether said copyright protected content may be transferred to said first client device comprises a determination of whether said content is being used, or has been transferred to, one of said second ones of said plurality of client devices.

12. The CPE of claim 9, wherein:
    said second interface is further configured to receive, from said first client device a reinstatement signal; and
    said at least one computer application is further configured to, in response to said reinstatement signal, cause said first client device to delete said copy, and cause said content to be marked as able to be used by said CPE, and able to be transferred to at least one second one of said plurality of client devices.

13. The CPE of claim 9, wherein said copy of said copyright protected content is generated based at least in part on capabilities information received from said first client device.

14. A method of providing protected content to a premises network comprising a plurality of client devices, said method comprising:
    collecting information regarding whether individual ones of a plurality of copyright protected content may be transferred to a second client device;
    utilizing said collected information to generate a user selectable available content list; and
    providing said list to said second client device;

receiving at a first client device a request for delivery of said protected content to said second client device, said first and second client devices being associated with a single subscriber account;

when said content is available and said delivery thereof is compliant with one or more protection rules associated with said content, generating a copy of said content based at least in part on capabilities information received from said second client device and providing said copy to said second client device; and preventing said first device from making use of said content while said second client device has access to said content.

15. The method of claim 14, wherein said act of providing comprises maintaining an original of said content stored at said first device and providing a copy thereof to said second device, and said act of preventing comprising rendering said original unavailable for copying and playback at said first device.

16. The method of claim 14, wherein when said content is unavailable or said delivery is not compliant with said one or more copy protection rules associated with said content, not providing said content to said second client device.

17. A method of providing content from a first device to a second device, comprising:

collecting information regarding whether individual ones of a plurality of copyright protected content may be transferred to said second device;

utilizing said collected information to generate a user selectable available content list;

providing said list to said second device;

receiving at said first device a request for said content from said second device;

determining whether said content is available, said determination being based at least in part on the presence of an indicator identifying said content as available for use by said first device; and when said content is available:

determining whether said request may be serviced, said determination based at least in part on one or more content protection rules associated with said content and at least one of (i) an identity of a user associated with said second device, and/or (ii) an identity of said second device;

moving said content from said first device to said second device via generation of a copy of said content based at least in part on capabilities information received from said second device; and updating said indicator to indicate a current status of said content as unavailable for subsequent use by said first device.

18. The method of claim 17, wherein said content comprises a copy specifically formatted to be compatible with capabilities of said second device.

19. A method of providing content from a first device to a second device, comprising:

collecting information regarding whether individual ones of a plurality of copy right protected content may be transferred to said second device;

utilizing said collected information to generate a user selectable available content list;

providing said list to said second device;

receiving at said first device a request for said content from said second device;

determining, via at least an indicator associated with said content, that a current status of content comprises an available status, and said delivery thereof is compliant with one or more protection rules associated with said content;

generating a transferable version of said content;

transferring said transferrable version of said content to said second device;

updating said indicator associated with said content to a temporarily unavailable status;

receiving, at said first device, a notification from said second device that said transferrable version of said content has been deleted from said second device; and updating said indicator associated with said content to reflect an available status.

20. The method of claim 19, wherein said act of generating a transferable version of said content comprises generating a version specifically formatted to be compatible with capabilities of said second device.

21. The method of claim 19, wherein said temporarily unavailable status comprises a status wherein said content is not able to be used or transferred by said first device.

22. The method of claim 21, wherein said act of updating said current status to said temporarily unavailable status further comprises allowing said content to remain stored on said first device despite an inability of said first device to use or transfer said content.

* * * * *